US008009879B2

(12) United States Patent
Iwai et al.

(10) Patent No.: US 8,009,879 B2
(45) Date of Patent: Aug. 30, 2011

(54) OBJECT RECOGNITION DEVICE, OBJECT RECOGNITION METHOD, OBJECT RECOGNITION PROGRAM, FEATURE REGISTRATION DEVICE, FEATURE REGISTRATION METHOD, AND FEATURE REGISTRATION PROGRAM

(75) Inventors: Yoshiaki Iwai, Tokyo (JP); Akira Nakamura, Kanagawa (JP); Weiguo Wu, Tokyo (JP); Takayuki Yoshigahara, Tokyo (JP)

(73) Assignee: Sony Corporation, Tokyo (JP)

( * ) Notice: Subject to any disclaimer, the term of this patent is extended or adjusted under 35 U.S.C. 154(b) by 1188 days.

(21) Appl. No.: 11/693,614

(22) Filed: Mar. 29, 2007

(65) Prior Publication Data

US 2007/0269107 A1    Nov. 22, 2007

(30) Foreign Application Priority Data

Mar. 31, 2006  (JP) ................. 2006-100705
Aug. 23, 2006  (JP) ................. 2006-227062
Mar. 27, 2007  (JP) ................. 2007-082109

(51) Int. Cl.
*G06K 9/62* (2006.01)
(52) U.S. Cl. ..................... 382/118; 382/124
(58) Field of Classification Search .................. None
See application file for complete search history.

(56) References Cited

U.S. PATENT DOCUMENTS

| 4,047,154 | A | * | 9/1977 | Vitols et al. | 382/125 |
| 4,135,147 | A | * | 1/1979 | Riganati et al. | 382/125 |
| 4,310,827 | A | * | 1/1982 | Asai | 382/125 |
| 4,646,352 | A | * | 2/1987 | Asai et al. | 382/125 |
| 4,790,564 | A | * | 12/1988 | Larcher et al. | 283/69 |
| 4,944,021 | A | * | 7/1990 | Hoshino et al. | 382/125 |
| 5,493,621 | A | * | 2/1996 | Matsumura | 382/125 |
| 5,524,161 | A | * | 6/1996 | Omori et al. | 382/125 |
| 5,613,014 | A | * | 3/1997 | Eshera et al. | 382/124 |
| 6,094,507 | A | * | 7/2000 | Monden | 382/195 |
| 6,546,122 | B1 | * | 4/2003 | Russo | 382/125 |

(Continued)

FOREIGN PATENT DOCUMENTS

JP          5-159065        6/1993

(Continued)

OTHER PUBLICATIONS

D. G. Lowe, "Object Recognition from Local Scale—Invariant Features", ICCV, 1999, 8 pages.
S. Belongie et al., "Shape Matching and Object Recognition Using Shape Contexts", IEEE Transactions on Pattern Analysis and Machine Intelligence, vol. 24, No. 24, pp. 509-522, 2002.
Frederic Jurie et al., "Scale-invariant Shape Features for Recognition of Object Categories", Proceedings of the 2004 IEEE Computer Society Conference on Computer Vision and Pattern Recognition, (CVPR), 2004, 7 pages.

(Continued)

*Primary Examiner* — Brian P Werner
(74) *Attorney, Agent, or Firm* — Finnegan, Henderson, Farabow, Garrett & Dunner, L.L.P.

(57) ABSTRACT

Disclosed herein is an object recognition device for recognition of an object that exists in an image, the device including: an edge image creator configured to create an edge image from a target image; a local feature extractor configured to extract a feature of each edge point on an edge image, and determine a base point and a support point from edge points in a local area defined for the edge image; a feature matching unit configured to implement, with reference to a memory, feature matching of a base point and a support point to thereby acquire a matching pair; and a matching pair determiner configured to determine final matching pairs by employing matching pairs having a highest matching cost among matching pairs obtained by the feature matching unit, wherein an object in a target image is identified based on matching pairs determined by the matching pair determiner.

13 Claims, 20 Drawing Sheets

U.S. PATENT DOCUMENTS

| | | | |
|---|---|---|---|
| 7,299,360 B2 * | 11/2007 | Russo | 713/182 |
| 7,349,560 B2 * | 3/2008 | Miyazaki | 382/124 |
| 2005/0213818 A1 | 9/2005 | Suzuki et al. | |

FOREIGN PATENT DOCUMENTS

| | | |
|---|---|---|
| JP | 2004-326693 | 11/2004 |
| JP | 2005-174062 | 6/2005 |

OTHER PUBLICATIONS

J.R. Parker, "The Canny Edge Detector", Algorithms for Image Processing and Computer Vision, John Wiley & Sons, Inc., pp. 23-29, 1996.

\* cited by examiner

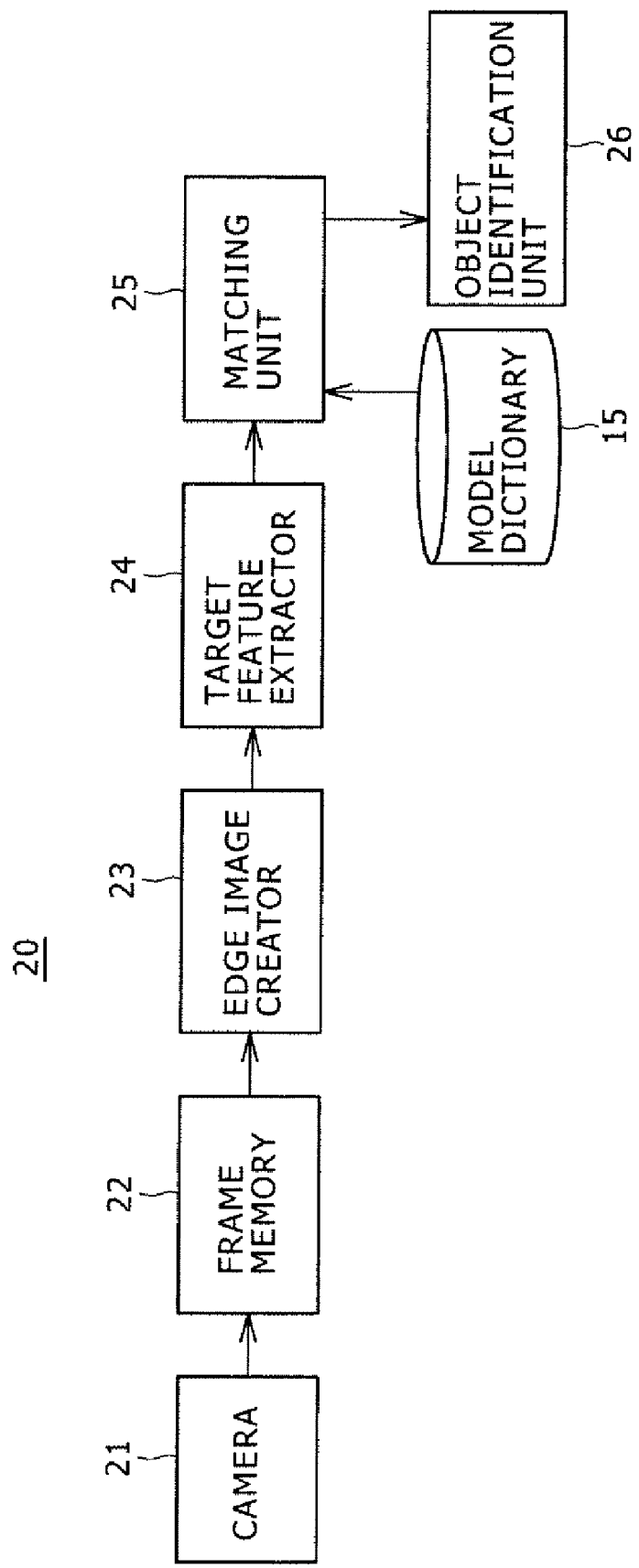

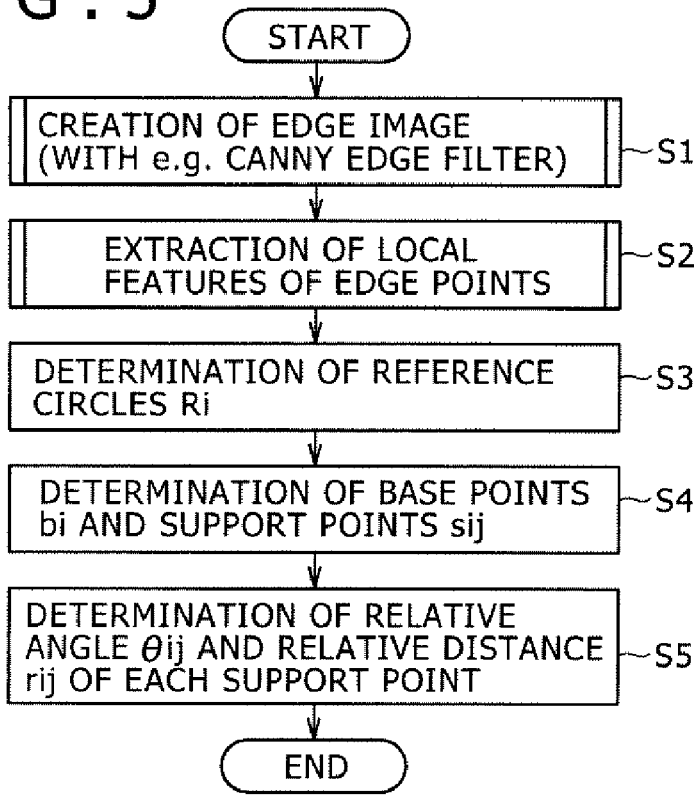
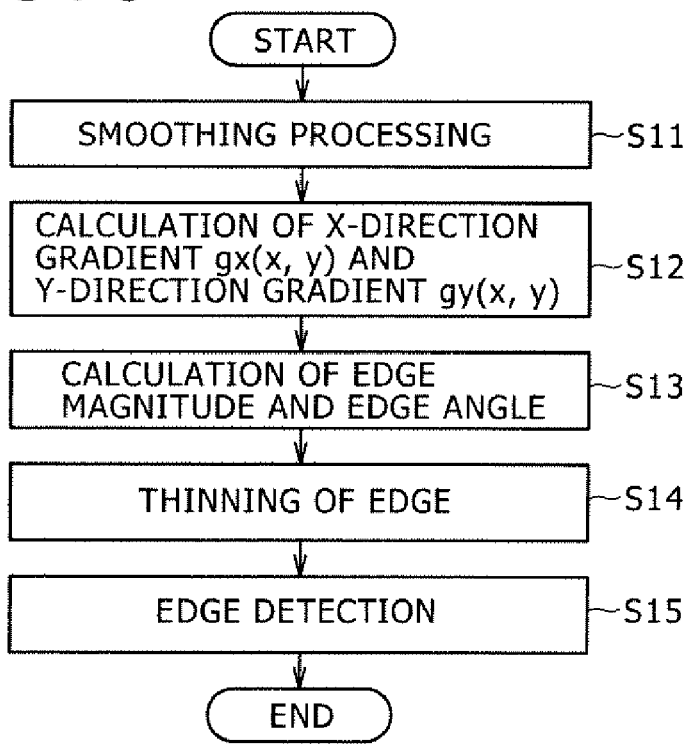

FIG.7A  FIG.7B
| -1 | 0 | +1 |
|---|---|---|
| -2 | 0 | +2 |
| -1 | 0 | +1 |
| +1 | +2 | +1 |
|---|---|---|
| 0 | 0 | 0 |
| -1 | -2 | -1 |
FIG.8
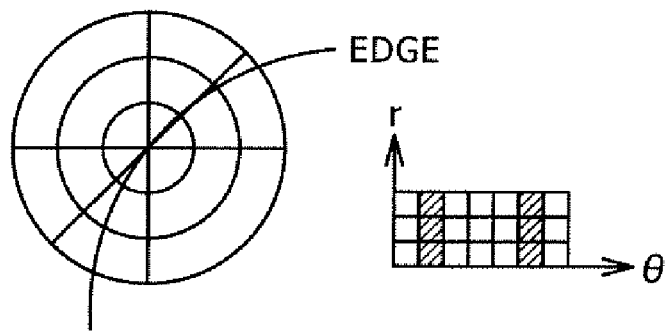
FIG.9
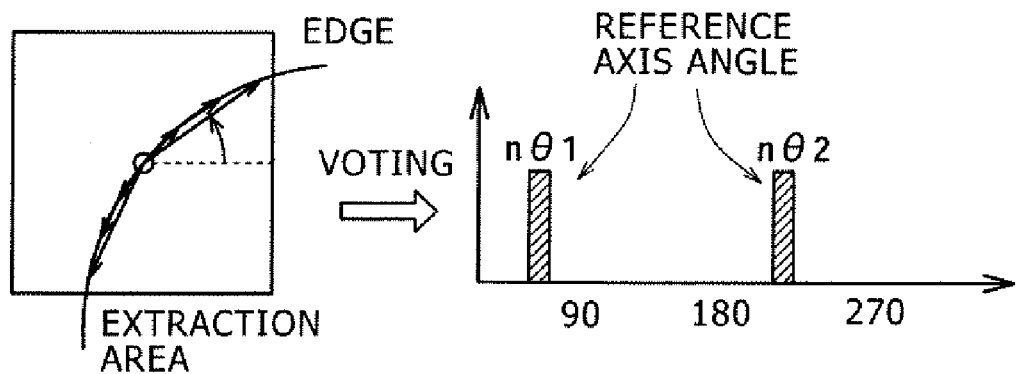

CONSTANT CIRCLE RADIUS

VARIABLE CIRCLE RADIUS

H_max VALUE, r_max VALUE $d\theta = n'\theta - \theta n$

DIFFERENCE IN REFERENCE AXIS DIRECTION
BETWEEN POINTS OF INTEREST

MATCHING

MODEL ↔ TARGET

FIG.22

$41 \begin{cases} b1: b'1: Cost1 \\ s11: s'11: Cost1 \\ s12: s'12: Cost1 \\ s13: s'13: Cost1 \\ s14: s'14: Cost1 \end{cases}$
$42 \begin{cases} b2: b'2: Cost2 \\ s21: s'21: Cost2 \\ s22: s'22: Cost2 \\ s23: s'23: Cost2 \end{cases}$
$43 \begin{cases} b3: b'3: Cost3 \\ s31: s'31: Cost3 \\ s32: s'32: Cost3 \\ s33: s'33: Cost3 \end{cases}$

FIG.23

51
| b1: b'1: Cost1 |
| s21(b1): s'21: Cost2 |

52
| b2: b'2: Cost2 |
| s31(b2): s'31: Cost3 |

53
| s22: s'22: Cost2 |
| s22(s33): s'33: Cost3 |

FIG.24A   FIG.24B
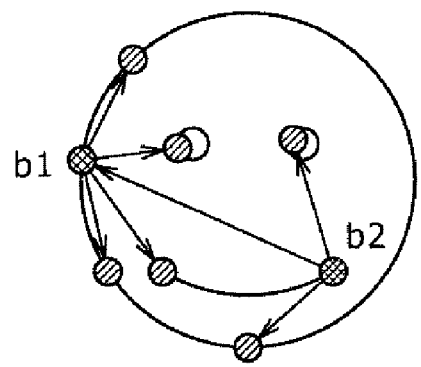
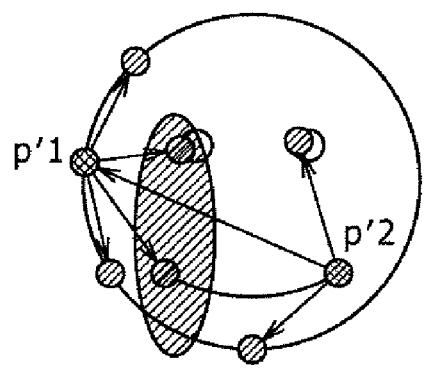
FIG.25
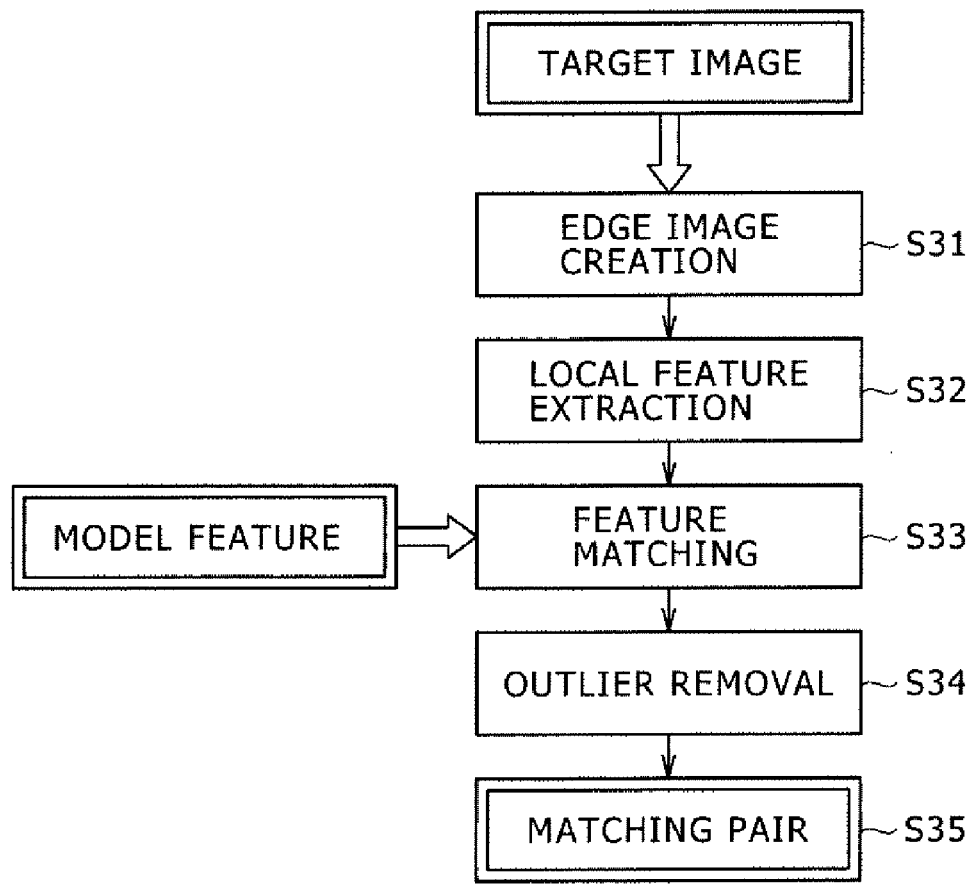

|   | a | b | c | d | e | f | g | h | i |
|---|---|---|---|---|---|---|---|---|---|
| a |   |   |   |   |   |   |   |   |   |
| b | d1 |   |   |   |   |   |   |   |   |
| c | d2 | d9 |   |   |   |   |   |   |   |
| d | d3 | d10 | d16 |   |   |   |   |   |   |
| e | d4 | d11 | d17 | d22 |   |   |   |   |   |
| f | d5 | d12 | d18 | d23 | d27 |   |   |   |   |
| g | d6 | d13 | d19 | d24 | d28 | d31 |   |   |   |
| h | d7 | d14 | d20 | d25 | d29 | d32 | d34 |   |   |
| i | d8 | d15 | d21 | d26 | d30 | d33 | d35 | d36 |   |

⇒ E_map1 ⇒ E_map1'

⇒ E_map2 ⇒ E_map2'

⇒ E_map3 ⇒ E_map3'

MULTIRESOLUTION IMAGES     ENTROPY MAP     SELECTED ENTROPY MAP

OBJECT RECOGNITION DEVICE, OBJECT RECOGNITION METHOD, OBJECT RECOGNITION PROGRAM, FEATURE REGISTRATION DEVICE, FEATURE REGISTRATION METHOD, AND FEATURE REGISTRATION PROGRAM

CROSS REFERENCES TO RELATED APPLICATIONS

The present invention contains subject matter related to Japanese Patent Application JP 2006-100705, JP 2006-227062 and JP 2007-082109 filed in the Japan Patent Office on Mar. 31, 2006, Aug. 23, 2006 and Mar. 27, 2007, respectively, the entire contents of which being incorporated herein by reference.

BACKGROUND OF THE INVENTION

1. Field of the Invention

The present invention relates to an object recognition device and an object recognition method for recognition of an object that exists in an image. Furthermore, the invention relates to an object recognition program executed by an object recognition device for recognition of an object that exists in an image. In addition, the invention relates to a feature registration device and a feature registration method used in an object recognition device for recognition of an object that exists in an image. Moreover, the invention relates to a feature registration program executed by a feature registration device.

2. Description of the Related Art

Studies have long been made on recognition of an object that exists in an image acquired from a camera. In a major existing method, an object is described globally, i.e., a template of textures of the entire object is prepared, and recognition is carried out through matching in which the template is applied to the entire object. In this method, however, it is desired that the whole of the object is visible because it is very difficult for this method to address e.g. partial hiding and rotation of an object in the acquired image.

However, in recent years, there have been successfully proposed methods that are very robust against partial hiding, rotation and so on of an object in an acquired image. In these methods, an object is described with local features and matching between the local features is carried out. The documents of these methods are typified by D. G. Lowe, "Object Recognition from local scale-invariant features", ICCV, 1999. However, although this method is very effective for an object having a large number of textures, it is difficult to apply this method to an object having a small number of textures.

As for recognition of an object having a small number of textures, there have been proposed many methods in which the outline shape of an object, i.e., the edge information of the object, is used. A global description scheme has been mainly employed also in these recognition methods using edge information. However, it is very difficult for the global description scheme to extract the outline of an entire object in a general image, and this scheme involves a problem of being fragile against partial hiding as described above. In recent years, however, following the success in the above-described description methods with texture-based local features, there have been proposed methods in which edge information is locally described. Examples of documents of the methods are as follows: S. Belongie, J. Malik, J. Puzicha, "Shape Matching and Object Recognition Using Shape Contexts", PAMI, 2002; and F. Jurie and C. Schmidr "Scale-invariant shape features for recognition of object categories", CVPR, 2004.

SUMMARY OF THE INVENTION

However, at present a method sufficiently robust for a general scene has not yet been established even in the methods of locally describing edge information, described in these documents.

There is a need for the present invention to provide an object recognition device and an object recognition method that allow an object to be recognized sufficiently robustly even in a general scene.

Furthermore, there is another need for the invention to provide a feature registration device and a feature registration method for registration of features used in object recognition processing.

In addition, there is further another need for the invention to provide an object recognition program executed by the object recognition device, and a feature registration program executed by the feature registration device.

According to an embodiment of the present invention, there is provided an object recognition device. The device includes an edge image creator configured to create an edge image from a target image including an object as a target of object recognition, and a local feature extractor configured to extract the feature of each edge point on an edge image created by the edge image creator, and determine a base point and a support point from edge points in a local area defined for the edge image. The base point is a point to which attention should be paid in the local area, and the support point is a point supporting the base point. The device includes also a feature matching unit configured to implement, with reference to a memory, feature matching of a base point and a support point that each have a feature extracted by the local feature extractor to thereby acquire a matching pair. The memory stores therein a base point, the feature of the base point, a support point that supports the base point, the feature of the support point, and the geometric positional relationship between the base point and the support point. The base point is a point to which attention should be paid in the vicinity of a local area defined for an edge image created in advance depending on the object, and is determined from edge points in the vicinity of the local area. The device further includes a matching pair determiner configured to determine final matching pairs by employing matching pairs having the highest matching cost among matching pairs obtained by the feature matching unit. In the device, an object in a target image is identified based on matching pairs determined by the matching pair determiner.

In recognition processing for an object with a small number of textures, this object recognition device extracts local features from the outline of the object, and implements outline description and matching thereof by use of the extracted local features, peripheral features, and the geometric positional relationship among them.

According to another embodiment of the present invention, there is provided an object recognition method. The method includes the steps of (a) creating an edge image from a target image including an object as a target of object recognition, and (b) extracting the feature of each edge point on an edge image created in the step (a), and determining a base point and a support point from edge points in a local area defined for the edge image. The base point is a point to which attention should be paid in the local area, and the support point is a point supporting the base point. The method includes also the step of (c) implementing, with reference to a memory, feature matching of a base point and a support point that each have a feature extracted in the step (b) to thereby acquire a matching pair. The memory stores therein a base point, the feature of the base point, a support point that supports the base point, the feature of the support point, and the geometric positional relationship between the base point and the support point. The base point is a point to which attention should be paid in the vicinity of a local area defined for an edge image created in advance depending on the object, and is determined from edge points in the vicinity of the local area. The method further includes the step of (d) determining final matching pairs by employing matching pairs having the highest matching cost among matching pairs obtained in the step (c). In this method, an object in a target image is identified based on matching pairs determined in the step (d).

According to another embodiment of the present invention, there is provided an object recognition program executed by an object recognition device for recognition of an object that exists in an image. The program includes the steps of (a) creating an edge image from a target image including an object as a target of object recognition, and (b) extracting the feature of each edge point on an edge image created in the step (a), and determining a base point and a support point from edge points in a local area defined for the edge image. The base point is a point to which attention should be paid in the local area, and the support point is a point supporting the base point. The program includes also the step of (c) implementing, with reference to a memory, feature matching of a base point and a support point that each have a feature extracted in the step (b) to thereby acquire a matching pair. The memory stores therein a base point, the feature of the base point, a support point that supports the base point, the feature of the support point, and the geometric positional relationship between the base point and the support point. The base point is a point to which attention should be paid in a vicinity of a local area defined for an edge image created in advance depending on the object, and is determined from edge points in the vicinity of the local area. The program further includes the step of (d) determining final matching pairs by employing matching pairs having the highest matching cost among matching pairs obtained in the step (c). In the program, an object in a target image is identified based on matching pairs determined in the step (d).

According to another embodiment of the present invention, there is provided a feature registration device that registers a feature used in object recognition processing for recognition of an object that exists in an image. The device includes an edge image creator configured to create an edge image of a model of an object in advance, and a model feature extractor configured to extract the feature of each edge point on an edge image created by the edge image creator, and determine a base point and a support point from edge points in a local area defined for the edge image. The model feature extractor stores in a memory the base point, the feature of the base point, the support point, the feature of the support point, and the geometric positional relationship between the base point and the support point. The base point is a point to which attention should be paid in the local area, and the support point is a point supporting the base point.

According to another embodiment of the present invention, there is provided a feature registration method for registration of a feature used in object recognition processing for recognition of an object that exists in an image. The method includes the steps of (a) creating an edge image of a model of an object in advance, and (b) extracting the feature of each edge point on an edge image created in the step (a), determining a base point and a support point from edge points in a local area defined for the edge image, and storing in a memory the base point, the feature of the base point, the support point, the feature of the support point, and the geometric positional relationship between the base point and the support point. The base point is a point to which attention should be paid in the local area, and the support point is a point supporting the base point.

According to another embodiment of the present invention, there is provided a feature registration program executed by a device that registers a feature used in object recognition processing for recognition of an object that exists in an image. The program includes the steps of (a) creating an edge image of a model of an object in advance, and (b) extracting the feature of each edge point on an edge image created in the step (a), determining a base point and a support point from edge points in a local area defined for the edge image, and storing in a memory the base point, the feature of the base point, the support point, the feature of the support point, and the geometric positional relationship between the base point and the support point. The base point is a point to which attention should be paid in the local area, and the support point is a point supporting the base point.

In the embodiments of the present invention in particular, the outline of an object is described with the extracted local features of base points, the local features of peripheral points (support points), and the geometric positional relationship among them.

Rotation invariance of each local feature is ensured. The base points and the support points can be determined adaptively depending on a local outline.

Furthermore, robust and flexible matching with use of the base points and the support points is possible as matching of the respective local features. By acquiring also the corresponding points of the support points by use of the matching cost of the base point, a matching pair can be acquired effectively.

Furthermore, by utilizing geometric constraints that exist among objects, mismatching can be removed effectively.

The embodiments of the invention employ local feature description, and therefore are robust against partial hiding of a target object. Furthermore, because each local feature is subjected to rotation normalization, the embodiments can address rotation of a target object. In addition, detection of corresponding points is accurate and robust because the feature of a point of interest, the features of peripheral points, and the geometric relationship among them are utilized to description of the feature of a local area. Moreover, the support points can be selected adaptively depending on a local outline shape, and hence detection of corresponding points is accurate and robust. Furthermore, in searching of corresponding points for support points, small areas are searched for the point having the highest similarity in each area. Therefore, the embodiments can absorb error caused due to correction of the support point positions, and can address also distortion of a target object.

In addition, a matching pair can be acquired effectively and more robustly by utilizing the cost at the time of determination of the corresponding point of a base point of a model as the cost of the corresponding points of the support points for the base point. Moreover, utilizing geometric constraints that exist in matching pairs between objects can remove mismatching, which allows robust recognition.

BRIEF DESCRIPTION OF THE DRAWINGS

FIG. 3 is a block diagram of a target image recognition part;

FIG. 5 is a flowchart showing a procedure of processing in the model feature registration part;

FIG. 6 is a flowchart showing a detailed procedure of edge image creation processing;

FIGS. 7A and 7B are diagrams showing differential filters used in the edge image creation processing;

FIG. 8 is a diagram for explaining a local feature;

FIG. 9 is a diagram for explaining reference axis extraction;

FIG. 22 is a diagram showing results obtained through the matching;

FIG. 23 is a diagram for explaining two corresponding points of an overlapping base point and support point;

FIGS. 24A and 24B are diagrams for explaining determination of corresponding points;

FIG. 25 is a flowchart showing another procedure of processing in the target image recognition part;

DETAILED DESCRIPTION OF THE PREFERRED EMBODIMENTS

Figure 1:
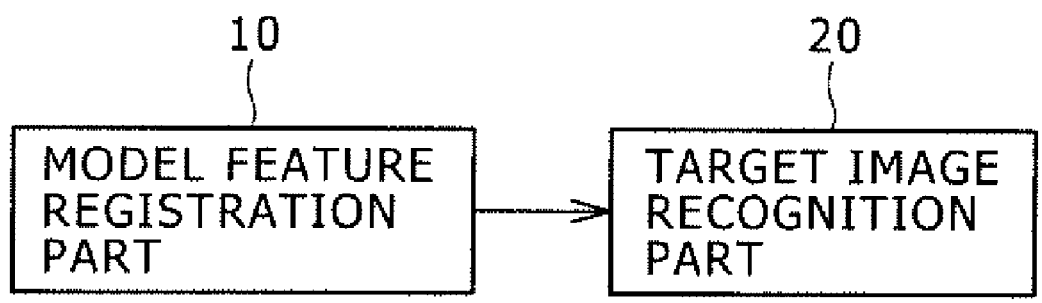
FIG. 1 is a schematic diagram of the configuration of an object recognition device according to a first embodiment of the present invention.

Embodiments of the present invention will be described below with reference to the accompanying drawings A first embodiment of the invention relates to an object recognition device 1 for recognition of an object that exists in an image. As shown in FIG. 1, the object recognition device 1 is formed of two parts: a model feature registration part 10 that registers features of a model; and a target image recognition part 20 that recognizes which object corresponds to a target in an image based on the model features registered by the model feature registration part 10.

The model feature registration part 10 creases an edge image of the model of the object and extracts the local features of edge points on the created edge image and points that support the local features in advance. Furthermore, the model feature registration part 10 registers the extracted features and points in a dictionary together with the geometric positional relationship among them in advance.

The target image recognition part 20 creates an edge image from a target image including an object as the target of object recognition, and extracts the local features of edge points on the created edge image. Furthermore, the target image recognition part 20 compares the extracted features with the model features registered in the dictionary by the model feature registration part 10, to thereby acquire matching pairs between the model and the target. Based on the acquired matching pairs, the target image recognition part 20 identifies the object in the target image.

Figure 2:
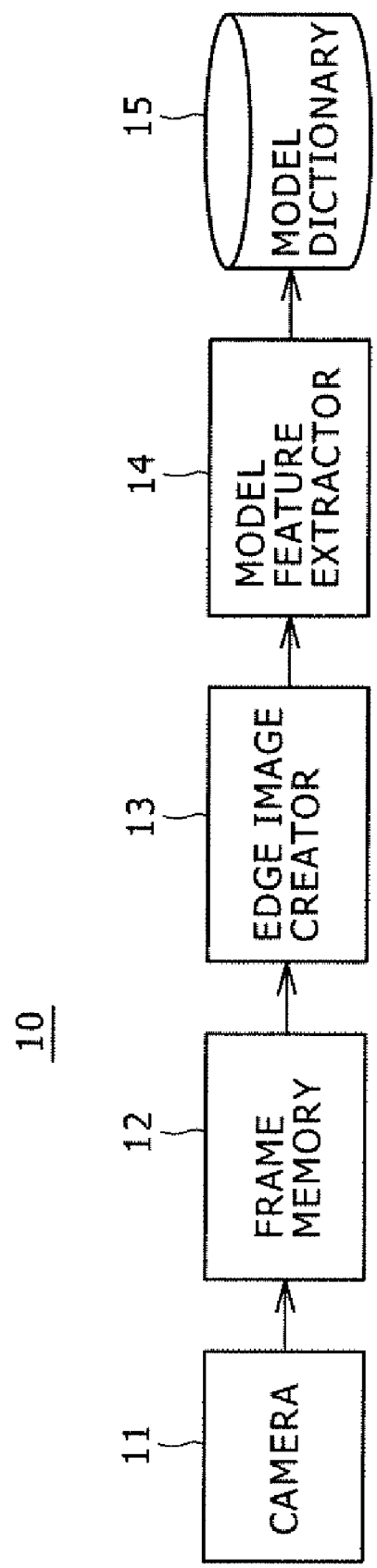
FIG. 2 is a block diagram of a model feature registration part.

In the model feature registration part 10, as shown in FIG. 2, an image captured by a camera 11 is stored in a frame memory 12, and an edge image creator 13 creates an edge image based on the image stored in the frame memory 12. Based on the edge image, a model feature extractor 14 extracts local features and points that support the local features, and calculates the geometric positional relationship among them. Furthermore, the model feature extractor 14 registers the obtained parameters in a model dictionary 15 on each model basis. More detailed descriptions will be made later about the local features, the support points that support the local features, and the geometric positional relationship among them of each model, registered in the model dictionary 15.

In the target image recognition part 20, as shown in FIG. 3, an image captured by a camera 21 is stored in a frame memory 22, and an edge image creator 23 creates an edge image based on the image stored in the frame memory 22. A target feature extractor 24 extracts local features based on edge points. A matching unit 25 compares the features extracted by the target feature extractor 24 with the model features registered in the model dictionary 15, to thereby acquire matching pairs between the model and the target. Based on the number of acquired matching pairs, an object identification unit 26 identifies the object in the target image.

Figure 4A:
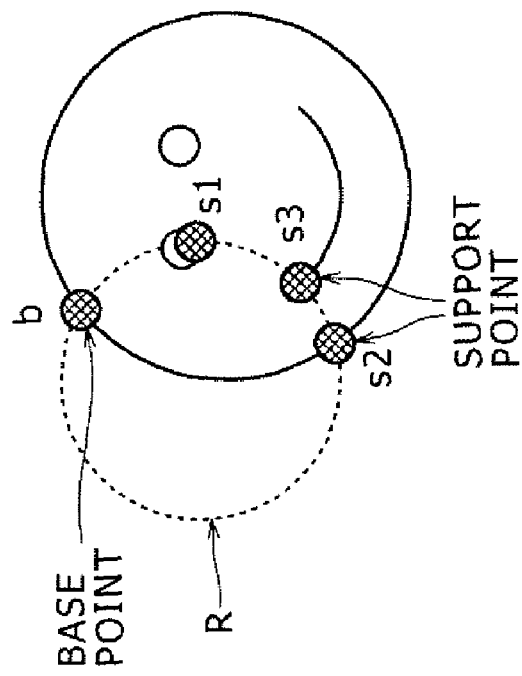
FIGS. 4A and 4B are diagrams showing an example of local area description.

Initially, processing by the model feature registration part 10 will be described below. FIG. 4 is a diagram showing an example of model description (example of local area description) in the model feature registration part 10. In an embodiment of the present invention, as shown in FIG. 4A, a local area of an edge image that represents an object shape is defined as a reference circle R, and edge points in the vicinity of the reference circle R are defined as a base point b, and support points s1, s2 and s3.

Figure 4B:
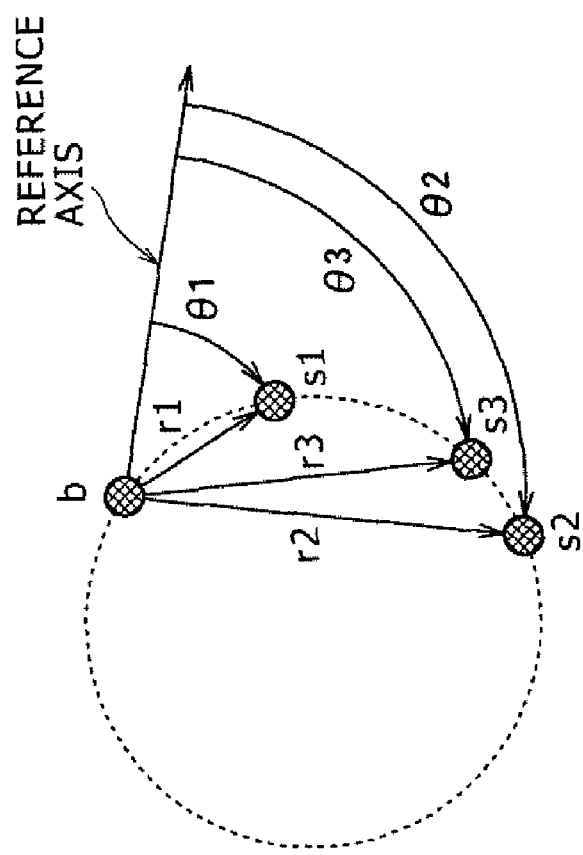

Furthermore, as shown in FIG. 4B, the relative positional relationships between the support points s1, s2 and s3 and the base point b are described with relative distances r1, r2 and r3, and relative angles θ1, θ2 and θ3. Each of the base point b, and the support points s1, s2 and s3 has a feature. A local area of the outline can be flexibly and robustly described by using as constraints the feature of the point of interest (base point b), the features of peripheral points (support point s1, s2 and s3), and the positional relationships therebetween (relative distances r1, r2 and r3, and relative angles θ1, θ2 and θ3).

As described above, the factors necessary for local model description are as follows: [1] creation of an edge image; [2] extraction of the local features of edge points; [3] determination of reference circles Ri; [4] determination of base points bi and support points sij; and [5] determination of the relative angle θij and the relative distance rij of each support point.

Processing based on the respective factors will be described below with reference to the flowchart of FIG. 5. In a step S1, an edge image is created (edge image creator 13). In a step S2, the local features of edge points are extracted (model feature extractor 14). In a step S3, reference circles Ri are determined. In a step S4, base points bi and support points sij are determined. In a step S5, the relative angle θij and the relative distance rij of each support point are determined.

The processing of each step will be sequentially described below. Initially, the processing of creating an edge image in the step S1 will be described. In the following, a method for creating an edge image from a grayscale image will be shown. There are various methods for extracting an edge. Among them, the Canny edge filter is famous in terms of stability and accuracy, and hence is employed in the edge extraction processing in this embodiment.

The Canny edge filter is described in detail in e.g. J. R. Parker, "Algorithms for Image Processing and Computer Vision", John Wiley & Sons, Inc. The procedure of the processing based on the Canny edge filter will be described below with reference to FIG. 6.

Initially, smoothing processing is executed in a step S11. Specifically, a Gauss filter G(x, y) is applied to an image f(x, y) to thereby reduce noise and small textures in the image. More specifically, as expressed in Equation (1), convolution between the Gauss filter G(x, y) and the image f(x, y) is executed to obtain an image g(x, y). The Gauss filter G(x, y) is expressed by Equation (2).

$$g(x, y) = G(x, y) * f(x, y) \qquad \text{Equation (1)}$$

$$G(x, y) = \frac{1}{\sqrt{2\Pi\sigma^2}} \exp\left[-\frac{x^2+y^2}{2\sigma^2}\right] \qquad \text{Equation (2)}$$

Subsequently, in a step S12, gradients gx(x, y) and gy(x, y) in the x- and y-directions are calculated. Specifically, the differential filters shown in FIGS. 7A and 7B are applied to the smoothed image g(x, y) created in the step S11 to thereby create gradient images. That is, the x-direction filter of FIG. 7A is applied to creation of the gradient gx(x, y) while the y-direction filter of FIG. 7B is applied to creation of the gradient gy(x, y).

Subsequently, in a step S13, the edge magnitude and the edge angle are calculated. Specifically, an edge magnitude image M(x, y) and an edge angle image θ(x, y) are created by using the gradient images gx(x, y) and gy(x, y) created in the step S12 in accordance with Equations (3) and (4).

$$M(x, y) = \sqrt{gx(x, y)^2 + gy(x, y)^2} \qquad \text{Equation (3)}$$

$$\theta(x, y) = \tan^{-1}\left[\frac{gy(x, y)}{gx(x, y)}\right] \qquad \text{Equation (4)}$$

Subsequently, in a step S14, thinning of the edge is executed. Specifically, because the created edge magnitude image M(x, y) partially has a width corresponding to several pixels, thinning processing is carried out so that this width is turned into the one-pixel width. More specifically, regarding the point (x, y) of which magnitude M(x, y) is not 0, the magnitude value M(x, y) is compared with the magnitude values M(x1, y1) and M(x2, y2) of the points (x1, y1) and (x2, y2). The point (x1, y1) corresponds to the point shifted from the point (x, y) in the edge direction θ(x, y), and the point (x2, y2) corresponds to the point shifted from the point (x, y) in the opposite edge direction. If the magnitude M(x, y) of the point (x, y) is lower than the magnitudes M(x1, y1) and M(x2, y2), the magnitude M(x, y) is set to zero based on a determination that the point (x, y) is not an edge point.

Subsequently, edge detection is executed in a step S15. Specifically, an edge image is created through threshold processing from the thinned edge magnitude image created in the step S14. In the processing with the Canny edge filter, two threshold values (T_high, T_low) are used in this threshold processing. Specifically, if the edge magnitude M(x, y) of the point (x, y) is higher than the threshold T_high, this point (x, y) is defined as the start point, and points of which edge magnitude is higher than the threshold T_low are traced as edge points.

The parameters in the processing with the Canny edge filter include the degree σ of the smoothing in the step S11 and two threshold values T_high and T_low for the edge detection in the step S15. Setting these parameters to proper values in advance allows highly accurate edge detection.

This is the end of the description of a specific example (e.g., the Canny edge filter) of the edge image creation processing of the step S1 in FIG. 5. The step S1 is followed by the step S2 in the processing procedure of FIG. 5.

In the step S2, the local features of the edge points are extracted. This local feature extraction is executed for all the edge points extracted In the step S1. In an embodiment of the present invention, the feature is obtained as a histogram of the number of edge points. Specifically, as shown in FIG. 8, the histogram represents the number of edge points in each of bins obtained by dividing a circle having a fixed radius along the circumferential direction and the radius direction. There is no particular limitation on the radius and the numbers of bins along the circumferential direction and the radius direction, respectively, in the local feature extraction.

Figure 10:
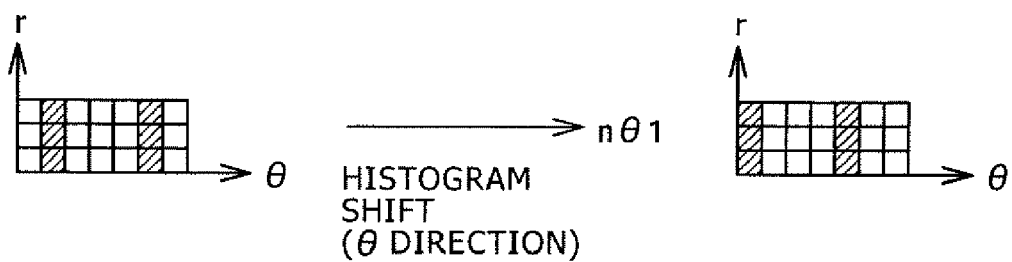
FIG. 10 is a diagram for explaining rotation normalization.

In this step S2, in order to realize the rotation invariance of the extracted feature, the reference axis direction is extracted, so that rotation normalization is carried out. For the extraction of the reference axis, as shown in FIG. 9, a histogram is created by voting the angles of the directions from the point of interest to peripheral edge points in a small area centered at the point of interest. The direction having the angle corresponding to the maximum value in the histogram is defined as the reference axis direction. After the angle of the reference axis of each point is found in this manner, as shown in FIG. 10, the histogram is shifted by the found angle in the circumferential direction, which allows the rotation normalization of the feature.

The features extracted in the step S2 are stored in F_Map together with the angles of the reference axes. Subsequently, in the step S3, reference circles R are determined. The basic concept of the determination of the reference circle R is to check whether or not edge points are sufficiently distributed in the vicinity of a circle.

Details of the method for determining the reference circle R will be described below. The outline of an object has diversity locally. Therefore, for utilization of the above-described geometric constraints, it is necessary that the size of the reference circle be different on each local area basis.

Figure 11A:
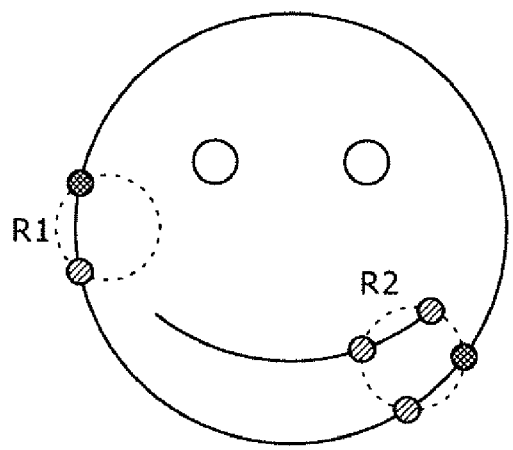
FIGS. 11A and 11B are diagrams showing examples of a reference circle.
Figure 11B:
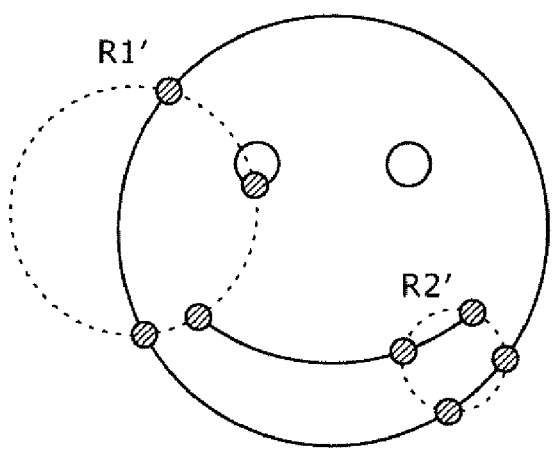

As shown in FIG. 11A, if the circle radius is constant, it is hard for the area as a reference circle R1 to offer sufficient geometric constraints. In contrast, if the radius of the reference circle R1 is greatly changed to employ a reference circle R1' as shown in FIG. 11B, this reference circle R1' can offer sufficient constraints. Specifically, using the reference circle R1' increases edge points by two. It should be obvious that depending on the outline of an object, an area arising from a decrease in the reference circle radius can also offer sufficient constraints.

A specific method for determining the reference circle R will be described below with reference to FIGS. 12 and 13. For the determination of the reference circle R, the center pixel and the radius of the reference circle R need to be determined. The basic concept is to extract an area that offers sufficient geometric constraints in the periphery of the reference circle. For the extraction, the degree of distribution of edge points in the vicinity of the entire reference circle is evaluated.

Figure 12:
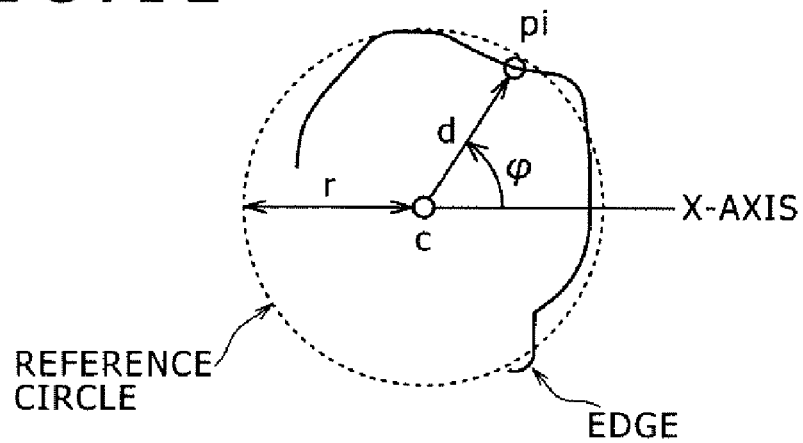
FIG. 12 is a diagram showing a criterion of reference circle evaluation.

Specifically, the criterion of the evaluation of the distribution of edge points is represented by the entropy value expressed by Equation (5), by using the reference circle radius r, the distance d from the reference circle center c to each edge point pi, and the angle $\phi$ formed by the x-axis and the segment between the reference circle center c and the edge point pi as shown in FIG. 12.

$$H(c,r) = -\Sigma h(k,c,r) \log h(k,c,r) \qquad \text{Equation (5)}$$

The angle of the reference circle is quantized into M steps, so that k takes a value from 1 to M. The function h(k, c, r) is expressed by Equation (6).

$$h(k, c, r) = \frac{1}{\Sigma \|d-r\|} \Sigma \|d-r\| K\left(k - \frac{M}{2\Pi}\varphi i\right) \qquad \text{Equation (6)}$$

In Equation (6), K(x) denotes the smoothing kernel and is expressed by Equation (7).

$$K(x) \equiv \exp\left(\frac{-x^2}{2}\right) \qquad \text{Equation (7)}$$

The entropy H(c, r) becomes higher as the degree of distribution of edge points in the vicinity of the entire reference circle becomes higher. That is, in this evaluation scheme, distribution of a sufficient number of edge points on a circle is expected when the entropy value is high.

The entropy calculation is started with calculation for a point that is not an edge point, and the circle radius is increased gradually and stepwise in calculation for one point. The entropy value is obtained after every radius increase, and finally the radius offering the highest entropy is stored. The radius offering the highest entropy is obtained for all the points. When a radius offering particularly high entropy is selected from all the stored radii, it is expected that a large number of edge points are distributed on the circle with this selected radius.

Figure 13:
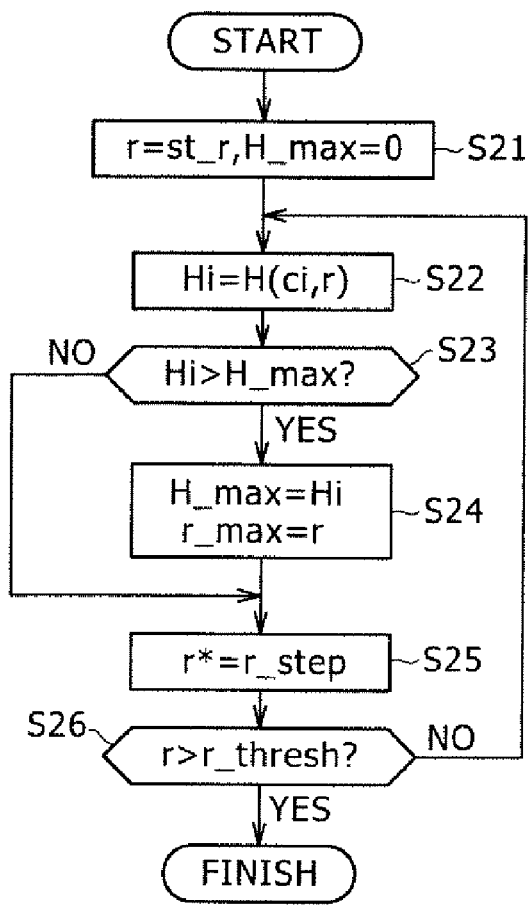
FIG. 13 is a flowchart showing the flow of reference circle determination processing.

FIG. 13 shows the flow of the processing of extracting (determining) the reference circle of any point i on an image based on the above-described criterion.

Initially, the reference circle radius is set to the predefined minimum radius st_r, and the maximum entropy H_max is set to zero (step S21). Subsequently, in accordance with Equation (5), the entropy Hi=H(ci, r) corresponding to this radius is calculated (step S22).

In a step S23, whether or not the entropy Hi calculated in the step S22 is higher than H_max is checked. If it is determined that the entropy Hi is higher than H_max (YES), the processing sequence proceeds to a step S24. If it is determined that the entropy Hi is lower than H_max (NO), the processing sequence proceeds to a step S25.

In the step S24, H_max is updated to Hi, and the radius r_max offering the maximum entropy is updated to r. In the step S25, the radius is incremented by a predetermined radius update step r_step. In a step S26, whether or not the resultant radius r is larger than the threshold value r_thresh is checked. If the radius r is larger than the threshold r_thresh (YES), this processing sequence is finished. If the radius r is lower than the threshold r_thresh (NO), the processing sequence returns to the step S22.

In this manner, through repetition of the steps S22 to S26, the radius is sequentially incremented by a predefined radius update step and the entropy is calculated after every radius increment, so that the maximum entropy H_max and the reference circle radius r_max offering this maximum entropy are stored.

Figure 14:
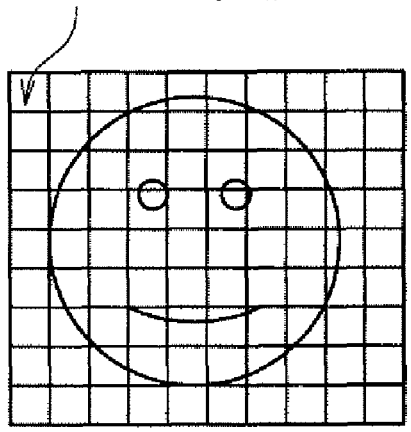
FIG. 14 is a diagram showing an entropy map.

This processing is executed for all the points on the image, and thereby a map E_Map like that shown in FIG. 14 can be obtained. The maximum entropy H_max and the reference circle radius r_max of each pixel are stored in this map E_Map.

Subsequently, non-maximum suppression is carried out with use of the entropy values in the map E_Map. Specifically, in the non-maximum suppression, if the pixel of interest does not have the maximum entropy in a local area including the pixel of interest (e.g. an area including the pixel of interest and near eight or fifteen pixels), the entropy value and the radius value of the pixel of interest stored in the map E_Map are set to 0.

After the non-maximum suppression, threshold processing is executed with a predefined minimum entropy value, so that the final map E_Map is created. The map E_Map has the same size as the image size, and an entropy value and a circle radius are stored for each pixel. Therefore, the positions of the pixels of which entropy is not zero are equivalent to the centers of reference circles, which allows determination of the reference circles Ri.

After the determination of the reference circles Ri in the step S3 in the flowchart of FIG. 5, base points and support points are determined in the step S4. A description will be made below about a method for determining base points hi and support points sij by use of the reference circles Ri (i=1 to N) obtained in the step S3 and the edge image. The sequential selection of the reference circle is based on the descending order of the entropy in the map E_Map obtained in the step S3.

Figure 15:
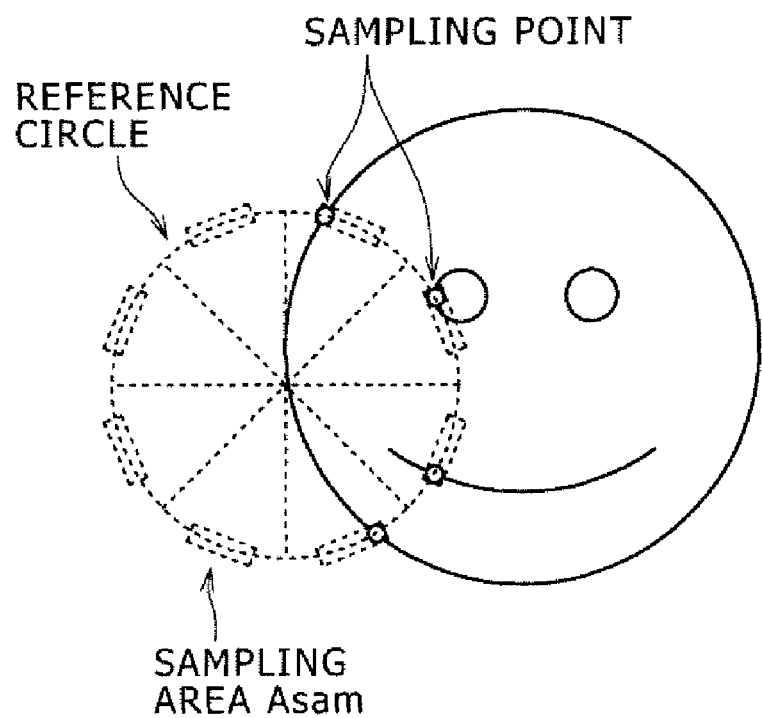
FIG. 15 is a diagram for explaining a sampling method.

Initially, for sampling of points, a reference circle is divided into M bins along the circumferential direction as shown in FIG. 15. The number M of bins arising from the division is changed depending on the radius of the reference circle. A sampling area is defined in each bin. For example, as shown in FIG. 15, a sampling area Asam is defined around the center of each circular arc. The point closest to the reference circle in the sampling area is defined as a sampling point mij (j=1 to M).

Subsequently, the base point is determined from the sampling point group. In an embodiment of the present invention, the object shape is described with a group of the base points. Therefore, it is desirable that the base points be distributed across the entire edge image without bias. For this purpose, the present embodiment employs a method of referring to the history of the points determined as the base points. Specifically, with reference to the history of the positions of the already-determined base points, the point that does not exist near the already-determined base points is selected from the sampling points mij (j=1 to M), so that the selected point is defined as a newly-determined base point and the other points are defined as support points. The history is updated after every determination of a base point.

Figure 16A:
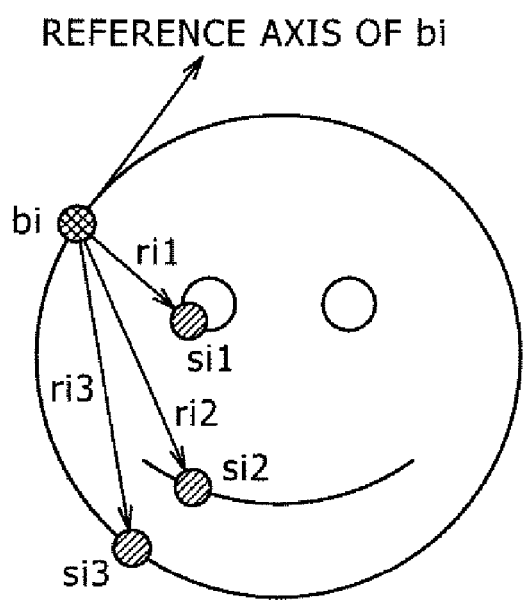
FIGS. 16A and 16B are diagrams for explaining the relative positions of support points.
Figure 16B:
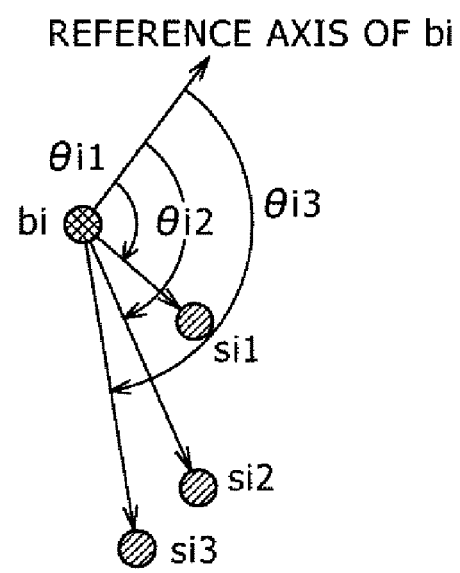

The step S4 is followed by the step S5 in FIG. 5, in which the relative angle θij and the relative distance rij of each support point are determined. In the step S4, the base points bi (i=1 to N) and the support points sij (i=1 to M) for the base points bi are determined. Therefore, in the step S5, the relative position of each support point sij (i=1 to M) with respect to the base point b is determined by using the reference axis direction of the base point. The relative angles θij and the relative distances rij shown in FIGS. 16A and 16B can be easily calculated because the reference axis direction of the base point has been already calculated in the step S2.

The information derived from the model image through the above-described processing is registered as the mode features in a dictionary. Details of the model features are as follows when the number of extracted base points is N.

Specifically, the positions (bxi, byi), the features bfi, and the reference axis directions bθi of the base points bi (i=1 to N) are registered in the dictionary.

Moreover, the relative positions (θij, rij), the features sfij, and the reference axis directions sθij of the support points sij (j=1 to M) are registered in the dictionary. The number of support points varies depending on the area.

The processing in the target image recognition part 20 will be described below. The basic concept of the recognition of a target image is to identify which of the models registered in the model dictionary 15 is the most similar to.

There are various methods for measuring the similarity degree. For example, in one of the methods, the cost between the features of N feature points of a model and those of the respective points of a target is calculated, and points having a sufficiently high cost value are stored as matching pairs. If the number M of obtained matching pairs is sufficiently large, the target can be identified as the model.

Figure 17:
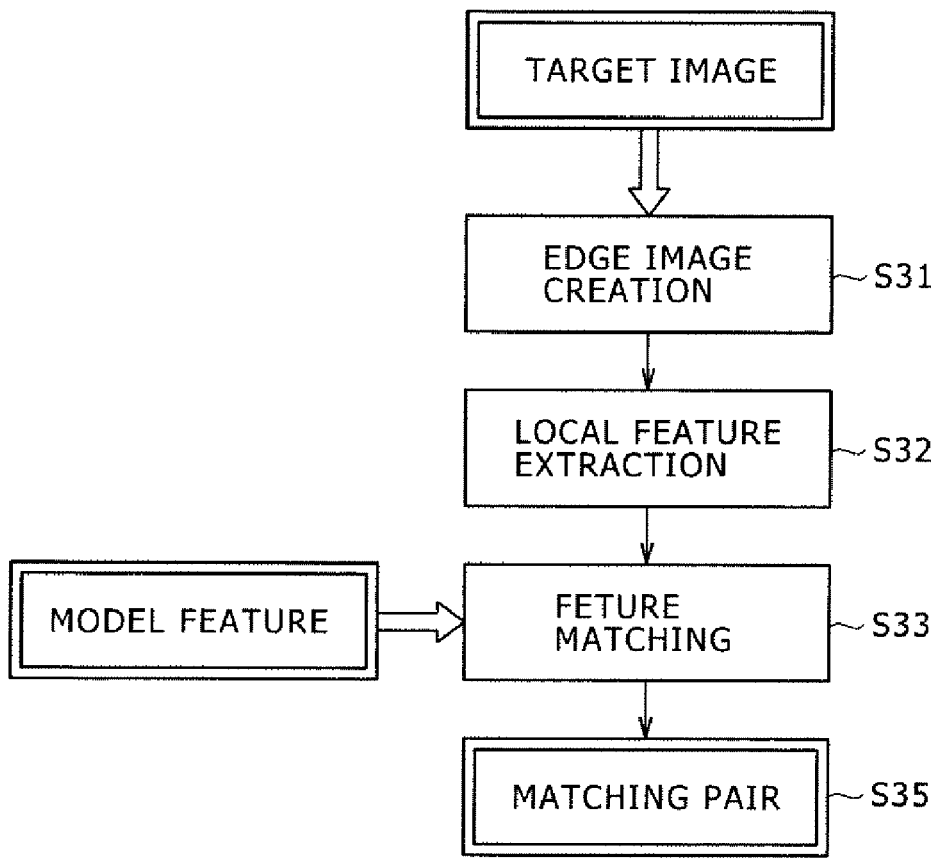
FIG. 17 is a flowchart showing a procedure of processing in the target image recognition part.

FIG. 17 is a flowchart showing the flow of the processing of acquiring matching pairs between a target image and a model. In a step S31, the edge image creator 23 creates an edge image from a target image stored in the frame memory 22. Subsequently, in a step S32, the local features of the edge image created in the step S31 are extracted. Next, feature matching is carried out with reference to the model features in a step S33. At last, matching pairs are acquired in a step S35.

The processing of each step will be described below. The edge image creation processing in the step S31 is similar to the processing of extracting model features (step S1). The local feature extraction in the step S32 is to extract the local feature of each edge point on a target image, created in the step S31. Specifically, processing similar to the model feature extraction processing (step S2) is executed. In this step S32, the local feature extraction only for base points and support points is not executed, but the local features of all the edge points are extracted.

The feature matching in the step S33 will be described below. In the step S33, matching between the model features registered in the model dictionary and the target features extracted in the local feature extraction processing (step S32) is carried out to acquire matching pairs between the model and the target.

Figure 18:
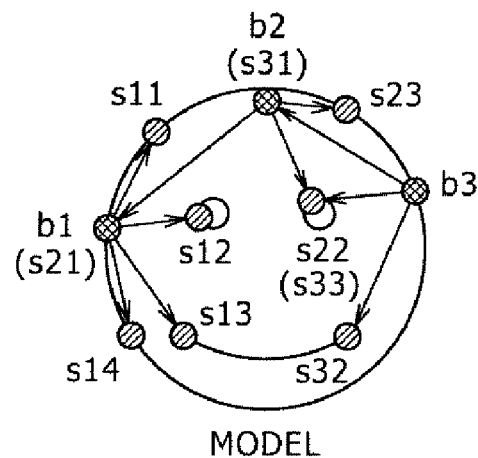
FIG. 18 is a diagram for explaining overlapping of a base point and a support point with another support point.

A specific method for the matching between features will be described below. As described above, in the model feature description in an embodiment of the present invention, plural support points sij are assigned to one base point bi. Furthermore, in an embodiment of the present invention, because a model is expressed by plural areas having different sizes, there is a possibility that a base point and a support point overlap with another support point as shown in FIG. 18. FIG. 18 is based on an assumption that a model is represented by three base points b1, b2, and b3. The base point b1 of the model has support points s11, s12, s13, and s14. The base point b2 of the model has support points s21(b1), s22, and s23. The base point b3 of the model has support points s31(b2), s32, and s33(s22). As indicated by the symbol in the parentheses, the support point s21 for the base point b2 is equivalent to the base point b1 (s21=b1). In addition, as indicated by the symbol in the parentheses, the support point s31 for the base point b3 is equivalent to the base point b2 (s31=b2). Furthermore, the support point s22 serves not only as a support point for the base point b2 but also as the support point s33 for the base point b3. That is, the base point b1 serves also as a support point for the base point b2 (b1=s21), the base point b2 serves also as a support point for the base point b3 (b2=s31), and the support point s22 serves as a support point for the base points b2 and b3 (s22=s33).

Figure 19A:
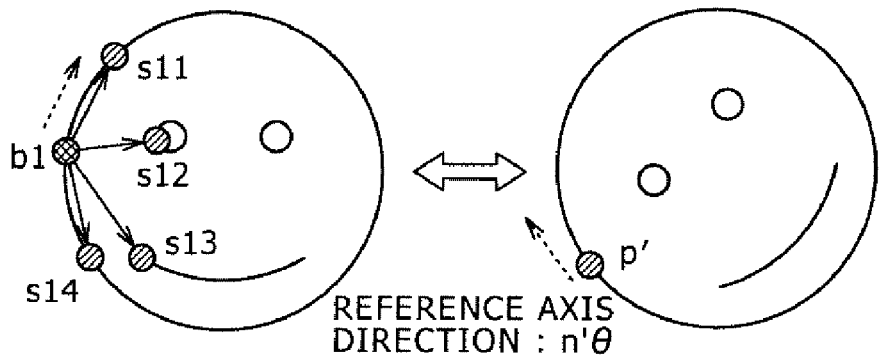
FIGS. 19A to 19C are diagrams for explaining the operation of a matching unit.
Figure 19B:
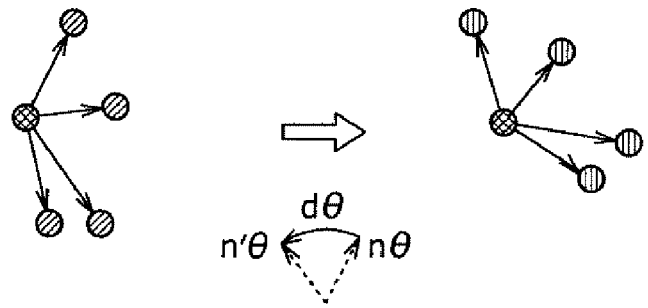

FIG. 19A shows a method for matching between a base point b1 of a model and a point p' on a target. Initially, the positions of support points s of the model are corrected depending on the reference axis of the point p' on the target. Specifically, with use of the reference axis direction nθ of the base point b1 on the model and the reference axis direction n'θ of the point p' on the target, position correction shown in FIG. 19B is carried out. Specifically, the reference axis direction nθ of the base point b1 of the model is inclined in the arrowhead direction by the difference dθ between the reference axis direction no and the reference axis direction n'θ of the point p' of the target.

Figure 19C:
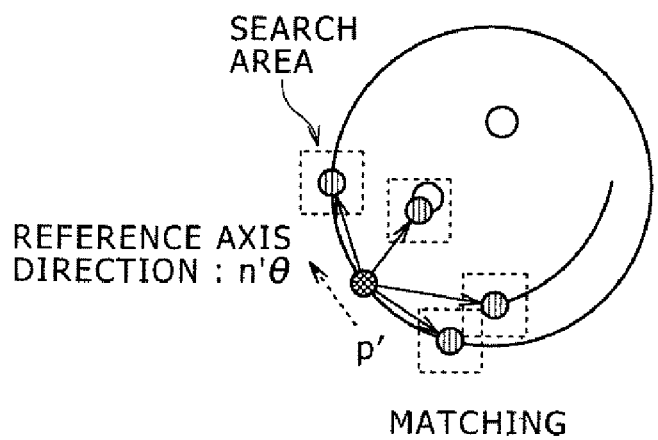

Subsequently, the base point b1 is aligned with the position of the point p', and the feature cost d(b1, p') between the points b1 and p' is calculated. As for each support point, as shown in FIG. 19C, each search area is searched for the point offering the minimum feature cost d(s1j, p'k). This searching of the search areas for the most-matching points can absorb an error in the reference axis direction used in the correction of the support point positions, and can address distortion in the target image.

When a model point and a target point are defined as m and t, respectively, the distance d(m, t) between local features is expressed by Equation (8).

$$d(m, t) = \frac{1}{2} \Sigma \frac{[hm(k) - ht(k)]^2}{hm(k) + ht(k)} \quad \text{Equation (8)}$$

In Equation (8), hm(k) denotes the histogram feature of the model point, and ht(k) denotes the histogram feature of the target point.

The total matching cost of both a base point and support points is expressed by Equation (9).

$$\text{Cost}(b1, p') = \frac{1}{1 + d(b1, p')} + \Sigma \frac{\alpha 1 j \beta 1 j}{1 + d(s1j, p'k)} \quad \text{Equation (9)}$$

Symbols $\alpha 1j$ and $\beta 1j$ in Equation (9) are the penalty cost of the angle and the distance, respectively, and are expressed by Equation (10).

$$\alpha 1j = \frac{1}{1 + 0.1|\theta 1j - \theta_{p'k}|} \quad \text{Equation (10)}$$

$$\beta 1j = r1j/r_{p'k} \text{ if } r1j/r_{p'k} < 1$$

$$\beta 1j = r_{p'k}/r1j \text{ otherwise}$$

In Equation (10), θp'k and rp'k denote the angle and the distance, respectively, of the point p'k, which is the most matching to a support point, with respect to the base point bi.

The above-described calculation is carried out for all the points on the target, and the point having the maximum cost is defined as a point b'1 corresponding to the base point b1. For example, referring to FIG. 18, corresponding points (s'11, s'12, s'13, and s'14) are obtained also for the respective support points (s11, s12, s13, and s14) for the base point b1. Therefore, the maximum cost value Cost(b1, b'1) and the difference dθ of the reference axis direction are stored together with the respective corresponding points of the base point and support points.

Figure 20:
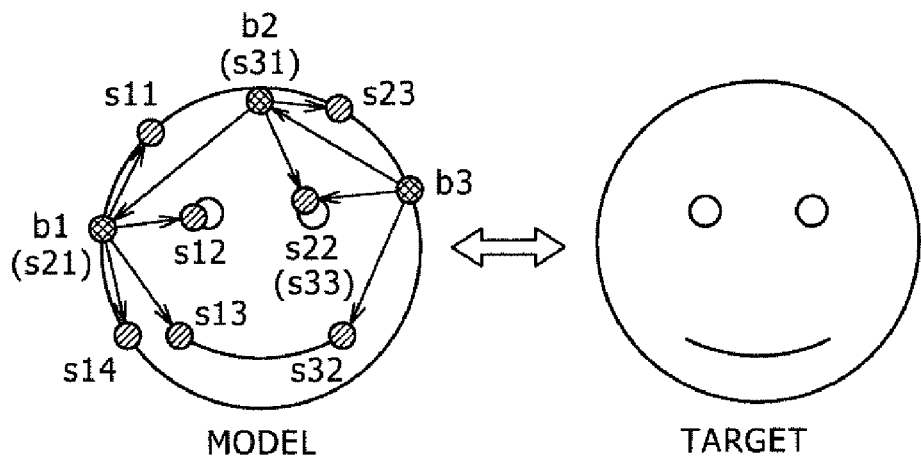
FIG. 20 is a diagram for explaining matching between a model and a target.
Figure 21A:
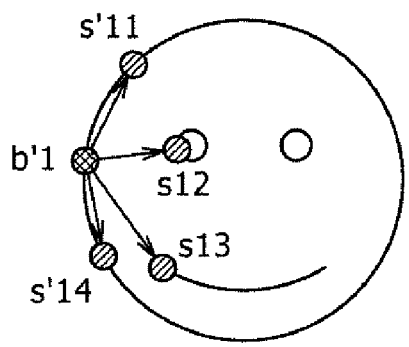
FIGS. 21A to 21C are diagrams each showing points on the target corresponding to a base point and support points on the model.
Figure 21B:
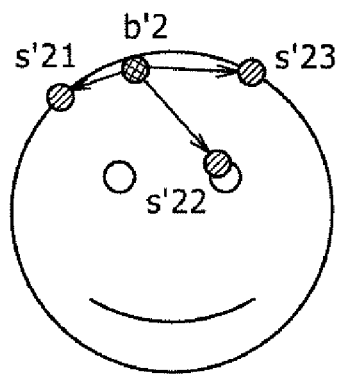
Figure 21C:
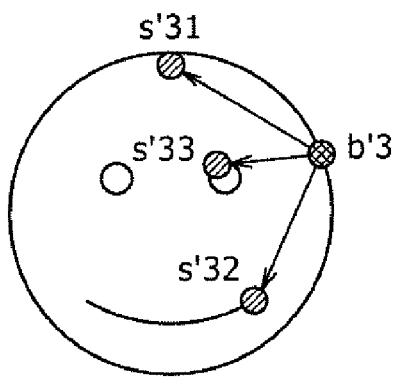

A specific example will be described below with reference to FIGS. 20 to 23. Similarly to FIG. 18, FIG. 20 shows that there is a possibility that a base point and a support point overlap with another support point. Results obtained through matching of the respective base points between a model and a target in FIG. 20 will be described below. Additional FIG. 21A shows the points on the target corresponding to the base point b1 and the support points s11, s12, s13, and s14. Additional FIG. 21B shows the points on the target corresponding to the base point b2 and the support points s21, s22, and s23. Additional FIG. 21C shows the points on the target corresponding to the base point b3 and the support points s31, s32, and s33.

Furthermore, in FIG. 22, the results obtained through the matching are shown with numerals 41, 42, and 43 given thereto. These results are expressed in the form of "point on the model:point on the target cost value." The cost values are obtained in accordance with Equation (9). Numeral 41 denotes the result in which Cost 1 is obtained. This result corresponds to the case where the points on the target corresponding to the base point b1 and the support points s11, s12, s13, and s14 are the points b'1, s'11, s'12, s'13, and s'14, respectively. Numeral 42 denotes the result in which Cost 2 is obtained. This result corresponds to the case where the points on the target corresponding to the base point b2 and the support points s21, s22, and s23 are the points b'2, s'21, s'22, and s'23, respectively. Numeral 43 denotes the result in which Cost 3 is obtained. This result corresponds to the case where the points on the target corresponding to the base point b3 and the support points s31, s32, and s33 are the points b'3, s'31, s'32, and s'33, respectively.

Because specific three points have the relationships b1=s21, b2=s31, and s22=s33 as described above, two corresponding points can be acquired for each of these three points as shown in FIG. 23. Numeral 51 denotes two corresponding points of the point b1 (=s21). The costs of these two corresponding points are "b1:b'1:Cost 1" and "s21($b1$): s'21:Cost 2." Numeral 52 denotes two corresponding points of the point b2 (=s31). The costs thereof are "b2: b'2: Cost 2" and "s31 ($b2$):s'31:Cost 3." Numeral 53 denotes two corresponding points of the point s22 (=s33). The costs thereof are "s22:s'22: Cost 2" and "s22($s33$): s'33: Cost 3." The cost calculation at the time of the matching is dependent on the set of a base point and support points as shown in Equation (9). Furthermore, due to the influence of the occlusion of the target image and so on, there is a high possibility that the corresponding points (b'1, s'21) of the points b1 and s21, which are the same point, are different from each other (b'1≠s'21).

That is, if the same model point serves as a base point that is different from the base point corresponding to the model point or a support point for the different base point, corresponding points each calculated for a respective one of the base points are acquired. In this case, groups of model points as a base point and support points for the base point are different from each other. Therefore, corresponding points on a target image offering the maximum matching cost, which is calculated in accordance with Equation (9), can be different corresponding points that have different matching costs depending on the group of the model points, even when these corresponding points correspond to the same model point. Consequently, by defining these plural different corresponding points as the candidates for the target point, different candidates for the target point that have plural different matching costs can be obtained for the same model point.

As described above, there is a possibility that plural candidates for a corresponding point are obtained for each of base points and support points on a model. Therefore, the candidate offering the highest cost value among the finally stored cost values is determined as the corresponding point of a model point, i.e., a matching pair (step S35). That is, the matching pair is not limited to a base point but obtained based on a scheme in which each of a base point and a support point is regarded as one point on a model.

The information to be stored as the final matching pairs is as follows: the coordinate point (mxi, myi) of the model image; the coordinate point (txi, tyi) of the target image; and the reference axis difference dθi (i=1 to N)

An advantage of the matching based on the above-described processing will be described below. The base point selected from the reference circle R at the time of extraction of model features is not necessarily the optimum base point. For example, if a target is partially hidden as shown in FIG. 24B, it is improbable that a model point b1 shown in FIG. 24A matches the corresponding point p'1 on the target. In contrast, there is a high possibility of matching of a model point b2 in FIG. 24A with the corresponding point p'2 on the target in FIG. 24B. In this example, the model point b1 serves also as a support point for the model point b2. Therefore, if corresponding points are held not only for a base point but also for support points at the time of determination of the corresponding point for the base point as described above, there is a possibility that the point p'1 can be obtained as the point corresponding to the model point b1.

The feature matching processing in the step S33 makes it possible to acquire matching pairs between a model and a target as described above. However, the matching processing in the step S33 yields a large number of outliers (mismatching pairs) because this matching is executed for local areas.

To address this, as shown in FIG. 25, an outlier removal processing is executed in a step S34 after the feature matching processing in the step S33. Specifically, outliers are removed in the step S34 from the matching pairs obtained in the step S33, so that the final matching pairs are acquired in the step S35. That is, incorrect matching pairs are removed in the step S34 for acquisition of the final matching pairs in the step S35.

A method for removing outliers will be described below. If a model and a target are an identical object, matching pairs need to satisfy geometric constraints expressed in Equation (11).

In Equation (11), (mx, my) denotes the coordinate of a model point, (tx, ty) denotes the coordinate of a target point, and dθ denotes a relative angle. Furthermore, dx and dy denote the shift amount in the x-direction and the y-direction, respectively.

$$\theta = \tan^{-1}\left(\frac{my}{mx}\right)$$
$$r = sqrt(mx^2 + my^2)$$

Equation (11)

-continued $$dx = tx - r * \cos(\theta + d\theta)$$

$$dy = ty - r * \sin(\theta + d\theta)$$

Figure 26:
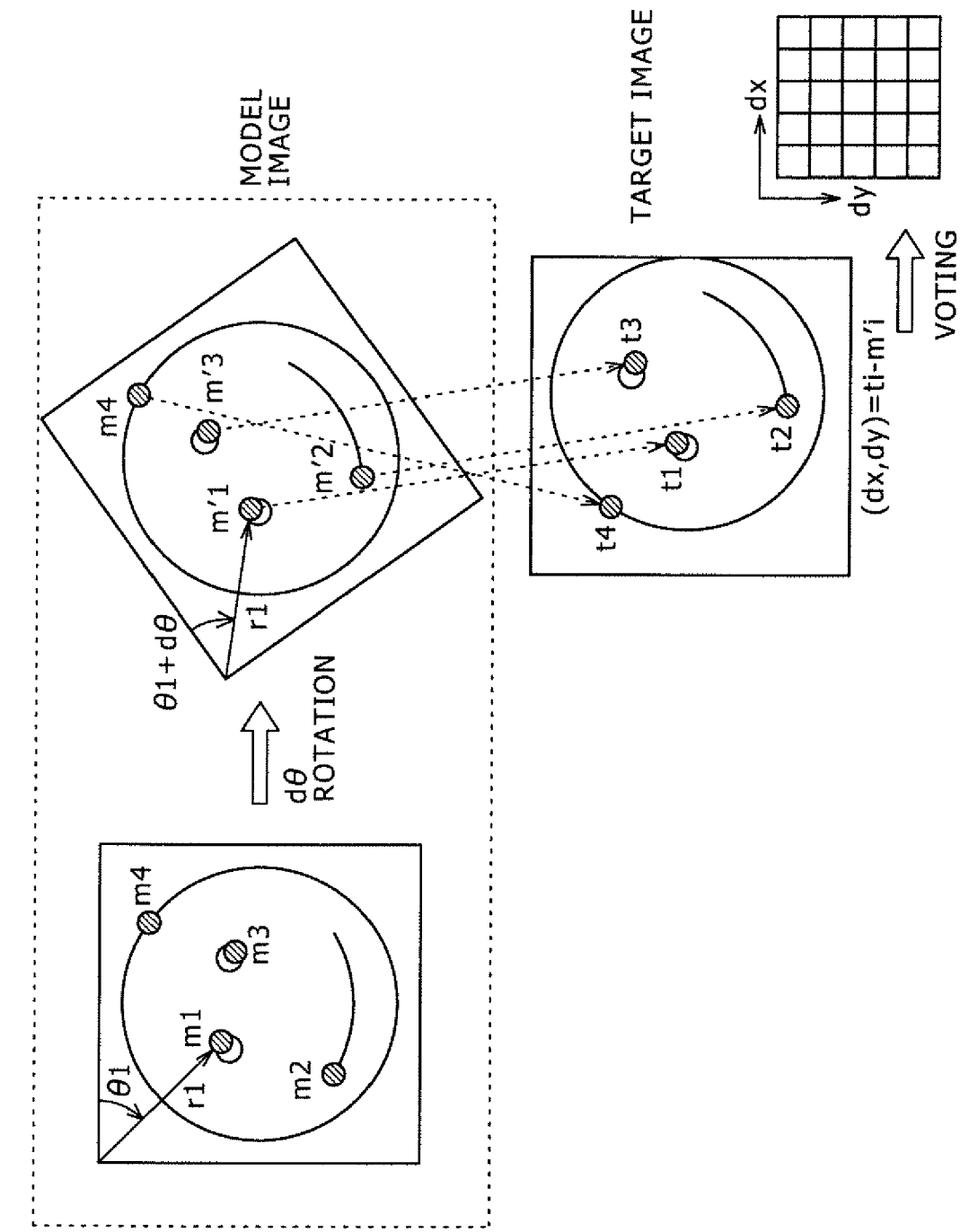
FIG. 26 is a diagram for explaining geometric constraints.

FIG. 26 shows a method for removing outliers by using this constraint condition. Symbol ti-m'i in FIG. 26 denotes a matching pair. For each pair, rotation normalization is carried out and the shift amount (dx, dy) is calculated by use of Equation (11) The calculated shift amount is voted in the corresponding bin in a two-dimensional space (dx-dy) prepared in advance.

The shift amounts of all the pairs are voted, and the bin with the largest value in the two-dimensional space (dx-dy) is determined. The pairs that do not have the shift amount (dx, dy) corresponding to the determined bin are removed as outliers from the matching pair group.

In FIG. 26 for example, the pairs t1-$m$'1, t2-$m$'2 and t3-$m$'3 have the same shift amount, and therefore are voted in the same bin in the two-dimensional space. In contrast, the pair t4-$m$'4 is voted in a different bin in the two-dimensional space, and hence is detected as an outlier.

The above-described procedure can acquire only pairs that satisfy the geometric constraints. If a sufficiently large number of pairs are finally obtained, the input target image can be identified as the model of interest.

The important points in the recognition processing by the target image recognition part 20 are the matching and the feature extraction. If the number of matching pairs is such that sufficiently high reliability is ensured, object identification by the matching pairs is allowed. Matching of features is equivalent to achievement of a large number of correct matching pairs, and hence offers a high possibility that a target is the object of interest.

In the present embodiment, local reference circles are defined for definition of base points and support points. However, instead of a circle, any other shape may be used as long as it is a local closed curve. However, in terms of rotation normalization processing, a circle is more advantageous.

Figure 27:
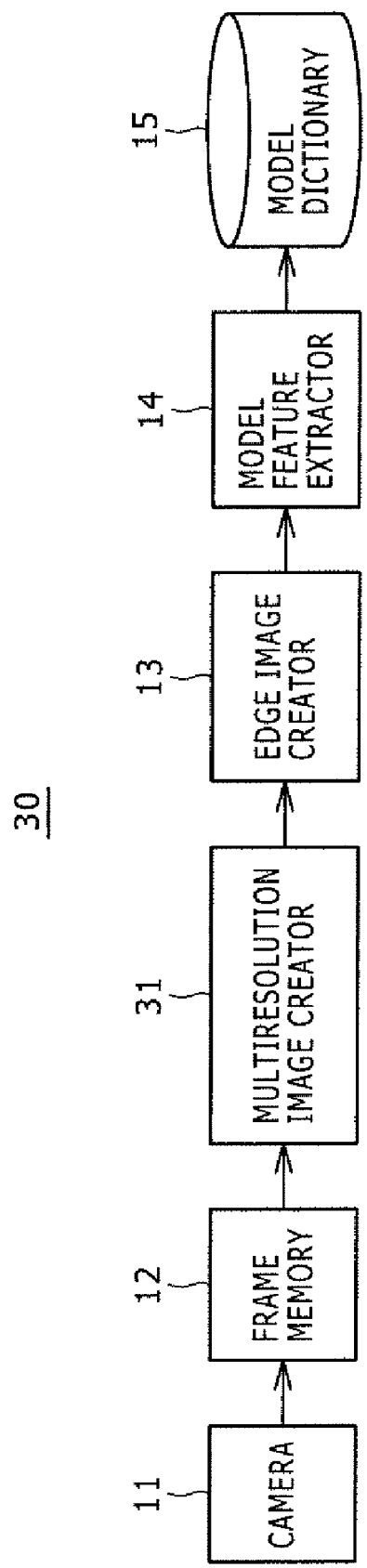
FIG. 27 is a block diagram of a model feature registration part used in an object recognition device according to a second embodiment of the invention.

Another embodiment of the present invention will be described below. This embodiment also relates to the object recognition device 1 shown in FIG. 1, and is also to recognize an object that exists in an image. However, the configuration of the model feature registration part in this embodiment is different from that of FIG. 1. FIG. 27 shows a model feature registration part 30 in this embodiment.

The model feature registration part 30 is also a part for registering features of a model. Specifically, the model feature registration part 30 creases an edge image of the model of an object and extracts the local features of edge points on the created edge image and points that support the local features in advance. Furthermore, the model feature registration part 30 registers the extracted features in a dictionary together with the geometric positional relationship among them in advance.

Referring to FIG. 27, in the model feature registration part 30, an image captured by a camera 11 is stored in a frame memory 12, and a multiresolution image creator 31 creates plural multiresolution images based on the image stored in the frame memory 12. Details of the creation of multiresolution images will be described later. The plural multiresolution images created by the multiresolution image creator 31 are sent to the edge image creator 13. The edge image creator 13 creates an edge image for each of the plural multiresolution images.

Based on the plural edge images created by the edge image creator 13 for the plural multiresolution images the model feature extractor 14 extracts local features and support points that support the local features, and calculates the geometric positional relationship among them. Furthermore, the model feature extractor 14 registers the obtained features in a model dictionary 15 on each model basis.

As for the target image recognition part 20, this embodiment has the same configuration as that described above with FIG. 3, and therefore description thereof is omitted.

Processing by the model feature registration part 30 will be described below. In an example of model description (example of local area description) in the model feature registration part 30, as described above with FIG. 4A, a local area of an edge image that represents an object shape is defined as a reference circle R, and edge points in the vicinity of the reference circle R are defined as a base point b, and support points s1, s2 and s3.

Furthermore, as described above with FIG. 4B, the relative positional relationships between the support points s1, s2 and s3 and the base point b are described with relative distances r1, r2 and r3, and relative angles θ1, θ2 and θ3. Each of the base point b, and the support points s1, s2 and s3 has a feature. A local area of the outline can be flexibly and robustly described by using as constraints the feature of the point of interest (base point b), the features of peripheral points (support point s1, s2 and s3), and the positional relationships therebetween (relative distances r1, r2 and r3, and relative angles θ1, θ2 and θ3).

As described above, also in the model feature registration part 30, the factors necessary for local model description are as follows: [1] creation of an edge image; [2] extraction of the local features of edge points; [3] determination of reference circles Ri; [4] determination of base points hi and support points sij; and [5] determination of the relative angle θij and the relative distance rij of each support point. However, in the model feature registration part 30, processing of [3] determination of reference circles Ri, and [4] determination of base points hi and support points sij is different from that in the above-described model feature registration part 10.

Initially, a description will be made below about [3] determination of reference circles Ri, which is characteristic in the model feature registration part 30. The outline of an object has diversity locally as described above. Therefore, for utilization of the above-described geometric constraints, it is necessary that the size of the reference circle be different on each local area basis.

As described above with FIG. 4, if the circle radius is constant, it is difficult for the area as a reference circle R1 to offer sufficient geometric constraints. In contrast, if the circle radius is changed for such a area, a reference circle offering sufficient constraints can be obtained as shown with a circle R1'.

A specific method for determining the reference circle Ri will be described below. For the determination of the reference circle Ri, the center pixel and the radius thereof need to be determined. The basic concept of this circle determination is the same as that employed in the model feature registration part 10 of the above-described embodiment. Specifically, an area is extracted that offers distribution of sufficient edge points across the vicinity of the entire reference circle and large distances between the local features of the edge points on the reference circle.

Figures 28, 29:
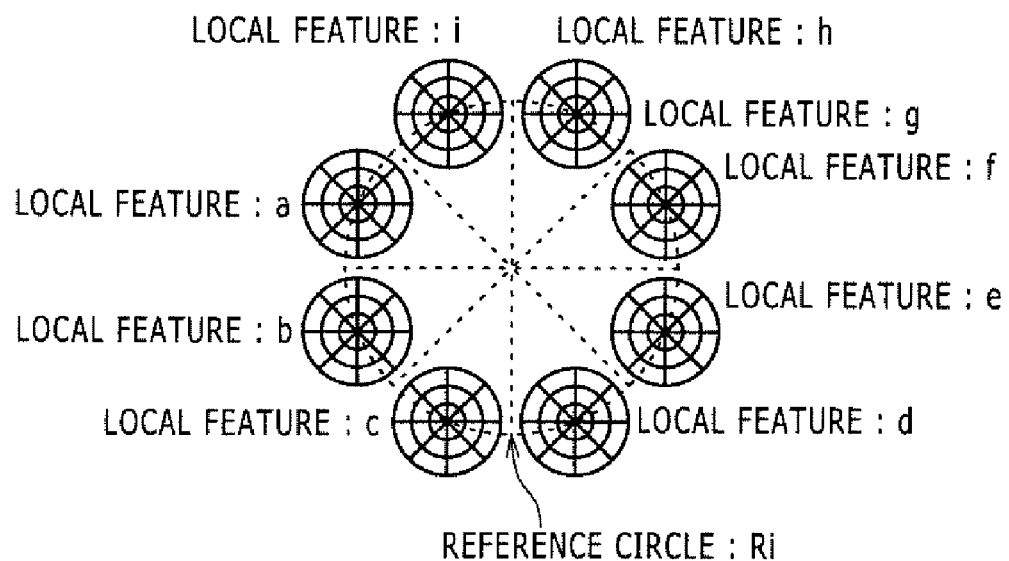
FIG. 28 is a diagram for explaining a criterion of reference circle evaluation.
FIG. 29 is a diagram showing a map of the distance between features.

More specifically, as shown in FIG. 28, the reference circle Ri is divided depending on the radius of local features, and local features near the respective circular arcs arising from the division are extracted. In the example of FIG. 28, a reference circle is divided into eight sectors, and local features a, b, c, ..., i are extracted as the local features near the circular arcs.

Subsequently, the distances between the features are calculated based on the following equation, and a map of the distance between the features shown in FIG. 29 is created.

$$d = \frac{1}{2} \Sigma \frac{[hm(k) - ht(k)]^2}{hm(k) + ht(k)}$$

Referring to FIG. 29, the distance between the local features a and b is d1. The distance between the local features a and c is d2. The distances between the local feature a and the local features d, e, f, g, h, and are d3, d4, d5, d6, d7, and d8, respectively. The distances between the local feature b and the local features c, d, e, f, g, h, and i are d9, d10, d11, d12, d13, d14, and d15, respectively. The distances between the local feature c and the local features d, e, f, g, h, and i are d16, d17, d18, d19, d20, and d21, respectively. The distances between the local feature d and the local features e, f, g, h, and i are d22, d23, d24, d25, and d26, respectively. The distances between the local feature e and the local features f, g, h, and i are d27, d28, d29, and d30, respectively. The distances between the local feature f and the local features g, h, and i are d31, d32, and d33, respectively. The distances between the local feature g and the local features h and are d34 and d35, respectively. The distance between the local features h and i is d36.

As described above, the aim of the circle determination processing is to extract an area that offers large distances between the respective features. As the specific criterion of the circle evaluation, the entropy value of the distances (d1, ..., dn) between the features, expressed by the following equation, is used.

$$H(k) = -\Sigma d(k) \log d(k)$$

The entropy H(k) becomes higher as the distribution of the distances between the features becomes more uniform. Therefore, if the entropy H(k) is high, it is expected that the dependence of a respective one of the points on one feature is almost uniform.

Figure 30:
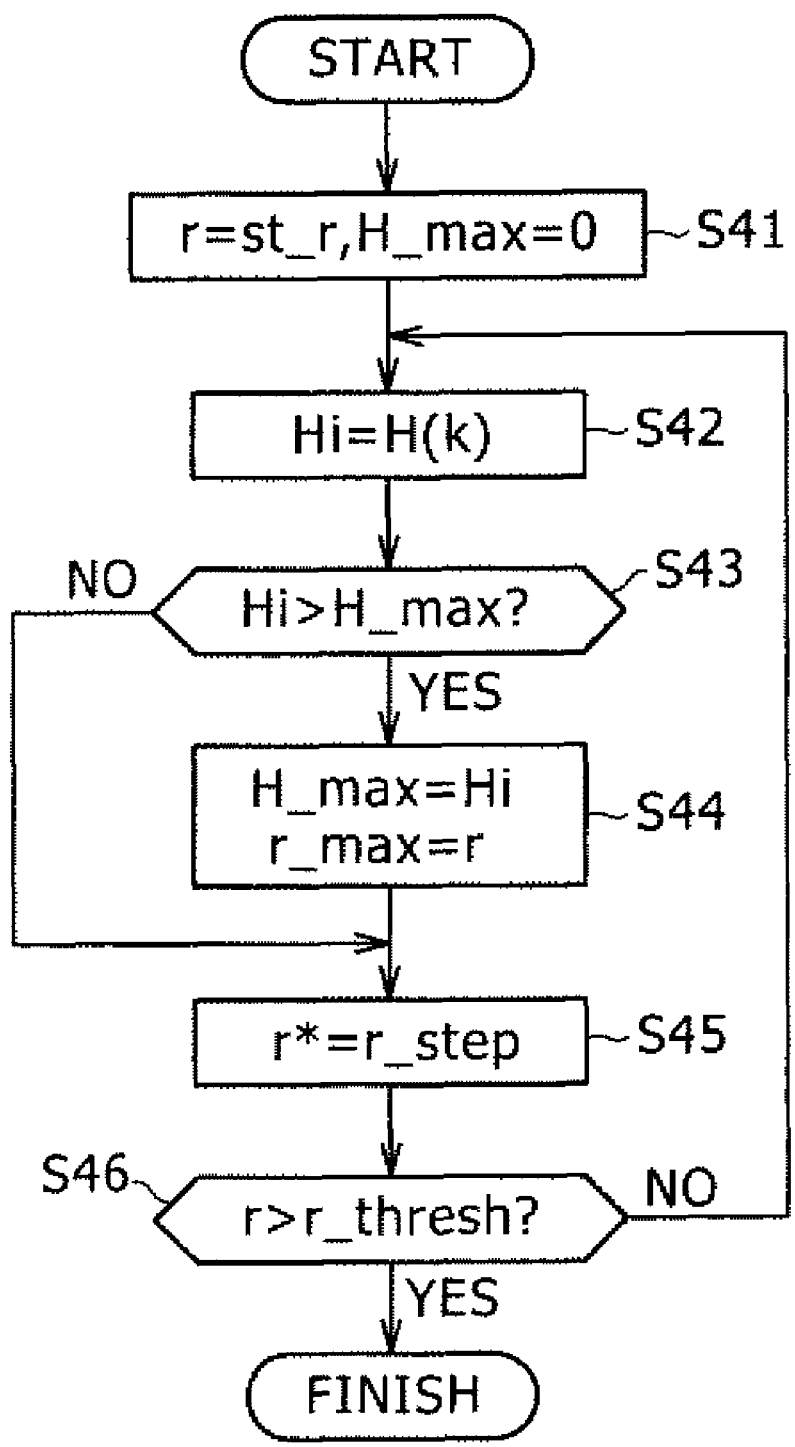
FIG. 30 is a flowchart showing a procedure of reference circle determination processing.

FIG. 30 shows the flow of the processing of extracting the reference circle of any point i on an image with use of this evaluation criterion. Initially, in a step S41, the radius of the reference circle Ri is set to the predefined minimum radius st_r, and the maximum entropy H_max is set to zero. Subsequently, in a step S42, entropy Hi corresponding to this radius is calculated in accordance with the above-described equations. In a step S43, whether or not the entropy Hi is higher than the maximum entropy H_max is determined. If the entropy Hi is higher, in a step S44, the maximum entropy H_max is updated to this entropy Hi and stored, and the radius r_max of the reference circle offering this entropy Hi is stored. In a step S45, the radius is incremented by a predetermined radius update step r_step. In a step S46, whether or not the resultant radius r is larger than the radius threshold value r_thresh is checked. If it is determined in the step S43 that the entropy Hi is not higher than the maximum entropy H_max, the processing sequence proceeds directly to the step S45. If it is determined in the step S46 that the radius r is not larger than the radius threshold value r_thresh, the processing sequence returns to the step S42.

That is, through repetition of the steps S42 to S46, the radius is sequentially incremented by the predefined radius update step r_step and the entropy is calculated after every radius increment, so that the maximum entropy Hi_max and the reference circle radius r_max offering the maximum entropy are stored.

This processing is executed for all the points on the image, and thereby a map (E_Map) like that shown in FIG. 14 can be obtained. The maximum entropy and the reference circle radius of each pixel are stored in this map.

Subsequently, the above-described non-maximum suppression is carried out with use of the entropy values in the map E_Map. Specifically, in the non-maximum suppression, if the pixel of interest does not have the maximum entropy in a local area including the pixel of interest (e.g. an area including the pixel of interest and near eight or fifteen pixels), the entropy value and the radius value of the pixel of interest stored in the map E_Map are set to zero.

As shown in FIG. 31, the above-described processing is carried out for each of the multiresolution images created by the multiresolution image creator 31, followed by creation of a final entropy map for each image and selection of reference circles. Specifically, in each of the entropy maps of the respective multiresolution images, the entropy values are sorted in the descending order and the top N points are selected. The entropy value and the radius of the points other than the top N points in the map E_Map are set to 0, to thereby create final entropy maps E_Mapi (i=1, ..., 3).

Figure 31A:
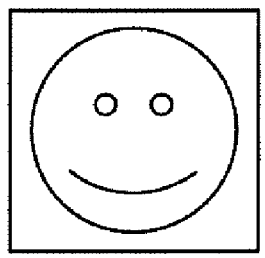
FIGS. 31A to 31C are diagrams for explaining selection of reference circles with use of multiresolution images.
Figure 31B:
Figure 31C:

A description will be made below about the multiresolution image creator 31. The multiresolution image creator 31 creates images having different resolutions, i.e., different reduction ratios, like those shown in FIGS. 31A, 31B and 31C. For example, if the image of FIG. 31A is a model image, the multiresolution image creator 31 creates the images of FIGS. 31B and 31C arising from reduction of the model image.

Furthermore, the multiresolution image creator 31 creates entropy maps E_Map1, E_Map2 and E_Map3 for the plural images with different resolutions, and obtains the reference circle radii from the entropy values. In this case, the number of points for which the entropy value is calculated is as follows for example: 300 points for the image of FIG. 31A, 250 points for the image of FIG. 31B, and 200 points for the image of FIG. 31C. As described above, the model feature registration part 30 can determine the optimum reference circles for images of different reduction ratios by using the multiresolution image creator 31 and the edge image creator 13.

Specifically, the map E_Map created for each of multiresolution images has the same size as the image size, and an entropy value and a circle radius are stored for each pixel. Therefore, the positions of the pixels of which entropy is not zero are equivalent to the centers of reference circles, which allows determination of the reference circles Ri.

In addition, the respective multiresolution images are treated in a unified manner based on entropy values, so that the reference circles are determined. This allows extraction of local areas offering higher identification performance.

After the determination of the reference circles Ri (i=1, ..., N), base points bi and support points sij are determined by using the reference circles Ri and the edge image in the same manner as the processing subsequent to the step S3 in FIG. 5. A simple description will be made below about a method for determining the base points bi and the support points sij in the respective reference circles Ri (i=1, ..., N). The sequential selection of the reference circles is based on the descending order of the entropy in the map E_Map obtained through the above-described processing.

Initially, for sampling of points, a reference circle is divided into M bins along the circumferential direction as shown in FIG. 15. A sampling area is defined in each bin. For example, as shown in FIG. 15, the sampling area is defined around the center of each circular arc arising from the division. The point closest to the reference circle in the sampling area is defined as a sampling point mij (j=1, ..., M). The base point is determined from the sampling point group. Specifically, with reference to the history of the positions of the already-determined base points, the point that does not exist near the already-determined base points is selected from the sampling points mij (j=1, ..., M), so that the selected point is defined as a newly-determined base point and the other points are defined as support points. The history is updated after every determination of a base point.

The subsequent processing by the model feature registration part 30 is the same as that described above with FIG. 5, and therefore description thereof is omitted. Furthermore, processing by the target image recognition part 20 is the same as that described above with FIGS. 3 and 16 to 21. However, it is desirable that the pairs obtained through the matching processing of the step S33 in FIG. 17 executed by the matching unit 25 in FIG. 3 be normalized with the scale ratio registered in the model dictionary 15, and then be subjected to the outlier removal processing of the step S34 in FIG. 25. In the model registration, the reference circles that offer large distances between local features and uniform distribution of the distances can be determined, and therefore biased dependence on one point can be avoided. The local area for description involves no bias of the dependence of a base point on support points, and hence robust matching is possible even when a partially hidden area exits.

As described above, in the present embodiment, local features to be used in matching are utilized for extraction of a local area such as a reference circle, which makes it possible to extract areas offering higher identification performance. Furthermore, in the local area for description, distances between local features are large and distribution of the distances is uniform, which can avoid biased dependence on one point. The local area for description involves no bias of the dependence of a base point on support points, and hence robust matching is possible even when a partially hidden area exits.

In addition, the local areas are determined from multiresolution images, followed by model description. Therefore, this embodiment can address a scale change of a target. The respective multiresolution images are treated in a unified manner based on entropy values, so that the local areas are determined. This allows extraction of local areas offering higher identification performance.

The model feature registration part of FIG. 2 may also include the multiresolution image creator between the frame memory 12 and the edge image creator 13.

It should be understood by those skilled in the art that various modifications, combinations, sub-combinations and alterations may occur depending on design requirements and other factor in so far as they are within the scope of the appended claims or the equivalents thereof.

What is claimed is:

1. An object recognition device for recognition of an object that exists in an image, the device comprising:
   an edge image creator configured to create an edge image from a target image including an object as a target of object recognition;
   a local feature extractor configured to extract a feature of each edge point on an edge image created by the edge image creator, and determine a base point and a support point from edge points in a local area defined for the edge image, the base point being a point to which attention should be paid in the local area, the support point being a point supporting the base point, wherein the local feature extractor divides a circle having a fixed radius along a circumferential direction and a radial direction, and translates into a histogram the number of edge points that exist in each of bins arising from the division to thereby extract a local feature of each of all edge points;
   a feature matching unit configured to implement, with reference to a memory, feature matching of a base point and a support point that each have a feature extracted by the local feature extractor to thereby acquire a matching pair, the memory storing therein a base point, a feature of the base point, a support point that supports the base point, a feature of the support point, and a geometric positional relationship between the base point and the support point, the base point being a point to which attention should be paid in a vicinity of a local area defined for an edge image created in advance depending on the object, the base point being determined from edge points in the vicinity of the local area; and
   a matching pair determiner configured to determine final matching pairs by employing matching pairs having a highest matching cost among matching pairs obtained by the feature matching unit, wherein an object in a target image is identified based on matching pairs determined by the matching pair determiner.

2. An object recognition device for recognition of an object that exists in an image, the device comprising:
   an edge image creator configured to create an edge image from a target image including an object as a target of object recognition;
   a local feature extractor configured to extract a feature of each edge point on an edge image created by the edge image creator, and determine a base point and a support point from edge points in a local area defined for the edge image, the base point being a point to which attention should be paid in the local area, the support point being a point supporting the base point;
   a feature matching unit configured to implement, with reference to a memory, feature matching of a base point and a support point that each have a feature extracted by the local feature extractor to thereby acquire a matching pair, the memory storing therein a base point, a feature of the base point, a support point that supports the base point, a feature of the support point, and a geometric positional relationship between the base point and the support point, the base point being a point to which attention should be paid in a vicinity of a local area defined for an edge image created in advance depending on the object, the base point being determined from edge points in the vicinity of the local area; and
   a matching pair determiner configured to determine final matching pairs by employing matching pairs having a highest matching cost among matching pairs obtained by the feature matching unit, wherein an object in a target image is identified based on matching pairs determined by the matching pair determiner;
   wherein the local feature extractor
   extracts a reference axis direction and implements rotation normalization for realization of rotation invariance of an extracted feature, and
   creates a histogram by voting an angle of a direction from a point of interest to a peripheral edge point in a small area centered at the point of interest, and extracts a direction having an angle corresponding to a maximum value in the histogram as the reference axis direction.

3. The object recognition device according to claim 2, wherein
the local feature extractor obtains an angle of the reference axis direction for each point and shifts the histogram by the obtained angle in a circumferential direction, to thereby implement rotation normalization of the feature.

4. An object recognition device for recognition of an object that exists in an image, the device comprising:
an edge image creator configured to create an edge image from a target image including an object as a target of object recognition;
a local feature extractor configured to extract a feature of each edge point on an edge image created by the edge image creator, and determine a base point and a support point from edge points in a local area defined for the edge image, the base point being a point to which attention should be paid in the local area, the support point being a point supporting the base point;
a feature matching unit configured to implement, with reference to a memory, feature matching of a base point and a support point that each have a feature extracted by the local feature extractor to thereby acquire a matching pair, the memory storing therein a base point, a feature of the base point, a support point that supports the base point, a feature of the support point, and a geometric positional relationship between the base point and the support point, the base point being a point to which attention should be paid in a vicinity of a local area defined for an edge image created in advance depending on the object, the base point being determined from edge points in the vicinity of the local area; and
a matching pair determiner configured to determine final matching pairs by employing matching pairs having a highest matching cost among matching pairs obtained by the feature matching unit, wherein an object in a target image is identified based on matching pairs determined by the matching pair determiner,
wherein
the local feature extractor determines a reference circle having a proper radius for each of a plurality of multi-resolution images that are created by an multiresolution image creator and have different resolutions, and determines the base point and a plurality of the support points from the edge points in a vicinity of the reference circle.

5. An object recognition method for recognition of an object that exists in an image, the method comprising the steps of:
(a) creating an edge image from a target image including an object as a target of object recognition;
(b) extracting a feature of each edge point on an edge image created in the step (a), and determining a base point and a support point from edge points in a local area defined for the edge image, the base point being a point to which attention should be paid in the local area, the support point being a point supporting the base point;
(c) dividing a circle having a fixed radius along a circumferential direction and a radial direction, and translating into a histogram the number of edge points that exist in each of bins arising from the division to thereby extract a local feature of each of all edge points;
(d) implementing, with reference to a memory, feature matching of a base point and a support point that each have a feature extracted in the step (b) to thereby acquire a matching pair, the memory storing therein a base point, a feature of the base point, a support point that supports the base point, a feature of the support point, and a geometric positional relationship between the base point and the support point, the base point being a point to which attention should be paid in a vicinity of a local area defined for an edge image created in advance depending on the object, the base point being determined from edge points in the vicinity of the local area; and
(e) determining final matching pairs by employing matching pairs having a highest matching cost among matching pairs obtained in the step (d), wherein an object in a target image is identified based on matching pairs determined in the step (e).

6. A non-transitory computer-readable medium including instructions, executable by a processor, for performing a method of object recognition for recognition of an object that exists in an image, the method comprising the steps of:
(a) creating an edge image from a target image including an object as a target of object recognition;
(b) extracting a feature of each edge point on an edge image created in the step (a), and determining a base point and a support point from edge points in a local area defined for the edge image, the base point being a point to which attention should be paid in the local area, the support point being a point supporting the base point;
(c) dividing a circle having a fixed radius along a circumferential direction and a radial direction, and translating into a histogram the number of edge points that exist in each of bins arising from the division to thereby extract a local feature of each of all edge points;
(d) implementing, with reference to a memory, feature matching of a base point and a support point that each have a feature extracted in the step (b) to thereby acquire a matching pair, the memory storing therein a base point, a feature of the base point, a support point that supports the base point, a feature of the support point, and a geometric positional relationship between the base point and the support point, the base point being a point to which attention should be paid in a vicinity of a local area defined for an edge image created in advance depending on the object, the base point being determined from edge points in the vicinity of the local area; and
(e) determining final matching pairs by employing matching pairs having a highest matching cost among matching pairs obtained in the step (d), wherein an object in a target image is identified based on matching pairs determined in the step (e).

7. A feature registration device that registers a feature used in object recognition processing for recognition of an object that exists in an image, the device comprising:
an edge image creator configured to create an edge image of a model of an object in advance; and
a model feature extractor configured to extract a feature of each edge point on an edge image created by the edge image creator, and determine a base point and a support point from edge points in a local area defined for the edge image, the model feature extractor storing in a memory the base point, a feature of the base point, the support point, a feature of the support point, and a geometric positional relationship between the base point and the support point, the base point being a point to which attention should be paid in the local area, the support point being a point supporting the base point,
wherein the model feature extractor divides a circle having a fixed radius along a circumferential direction and a radial direction, and translates into a histogram the number of edge points that exist in each of bins arising from the division to thereby extract a local feature of each of all edge points.

8. A feature registration device that registers a feature used in object recognition processing for recognition of an object that exists in an image, the device comprising:
   an edge image creator configured to create an edge image of a model of an object in advance; and
   a model feature extractor configured to extract a feature of each edge point on an edge image created by the edge image creator, and determine a base point and a support point from edge points in a local area defined for the edge image, the model feature extractor storing in a memory the base point, a feature of the base point, the support point, a feature of the support point, and a geometric positional relationship between the base point and the support point, the base point being a point to which attention should be paid in the local area, the support point being a point supporting the base point,
   wherein the model feature extractor determines a reference circle having any optional radius and determines a base point and a plurality of support points from the edge points in a vicinity of the reference circle, and the model feature extractor calculates a relative positional relationship between each support point and the base point, and
   wherein the model feature extractor divides the reference circle into a plurality of regions along a circumferential direction and defines a sampling area in each region to thereby define a point closest to the reference circle in each sampling area as a sampling point, and the model feature extractor refers to a history of positions of already-determined base points to thereby select from a sampling point group a point other than a point near a pixel corresponding to the already-defined base point so that the selected base point is defined as a newly-determined base point and other sampling points are defined as support points.

9. A feature registration device that registers a feature used in object recognition processing for recognition of an object that exists in an image, the device comprising:
   an edge image creator configured to create an edge image of a model of an object in advance; and
   a model feature extractor configured to extract a feature of each edge point on an edge image created by the edge image creator, and determine a base point and a support point from edge points in a local area defined for the edge image, the model feature extractor storing in a memory the base point, a feature of the base point, the support point, a feature of the support point, and a geometric positional relationship between the base point and the support point, the base point being a point to which attention should be paid in the local area, the support point being a point supporting the base point,
   wherein the model feature extractor:
   determines a reference circle having any optional radius by using a feature of each edge point on an edge image created by the edge image creator and determines a base point and a plurality of support points from the edge points in a vicinity of the reference circle,
   calculates a relative positional relationship between each support point and the base point,
   extracts an area that offers a large distance between local features of edge points on the area to thereby determine the reference circle,
   divides a predetermined reference circle depending on a radius of a local feature and extracts a local feature for each region arising from the division,
   calculates a distance between features to create a map of a distance between features, and
   determines the reference circle by using the map.

10. The feature registration device according to claim 9, wherein
   the model feature extractor uses an entropy value of a distance between features as an evaluation criterion.

11. A feature registration device that registers a feature used in object recognition processing for recognition of an object that exists in an image, the device comprising:
   an edge image creator configured to create an edge image of a model of an object in advance; and
   a model feature extractor configured to extract a feature of each edge point on an edge image created by the edge image creator, and determine a base point and a support point from edge points in a local area defined for the edge image, the model feature extractor storing in a memory the base point, a feature of the base point, the support point, a feature of the support point, and a geometric positional relationship between the base point and the support point, the base point being a point to which attention should be paid in the local area, the support point being a point supporting the base point,
   wherein
   the model feature extractor determines a reference circle having a proper radius for each of a plurality of multi-resolution images that are created by an multiresolution image creator and have different resolutions, and determines the base point and a plurality of the support points from the edge points in a vicinity of the reference circle.

12. A feature registration method for registration of a feature used in object recognition processing for recognition of an object that exists in an image, the method comprising the steps of:
   (a) creating an edge image of a model of an object in advance;
   (b) extracting a feature of each edge point on an edge image created in the step (a), determining a base point and a support point from edge points in a local area defined for the edge image, and storing in a memory the base point, a feature of the base point, the support point, a feature of the support point, and a geometric positional relationship between the base point and the support point, the base point being a point to which attention should be paid in the local area, the support point being a point supporting the base point; and
   (c) dividing a circle having a fixed radius along a circumferential direction and a radial direction, and translating into a histogram the number of edge points that exist in each of bins arising from the division to thereby extract a local feature of each of all edge points.

13. A non-transitory computer-readable medium including instructions, executable by a processor, for performing a method of feature registration that registers a feature used in object recognition processing for recognition of an object that exists in an image, the method comprising the steps of:
   (a) creating an edge image of a model of an object in advance;
   (b) extracting a feature of each edge point on an edge image created in the step (a), determining a base point and a support point from edge points in a local area defined for the edge image, and storing in a memory the base point, a feature of the base point, the support point, a feature of the support point, and a geometric positional relationship between the base point and the support point, the base point being a point to which attention should be paid in the local area, the support point being a point supporting the base point; and (c) dividing a circle having a fixed radius along a circumferential direction and a radial direction, and translating into a histogram the number of edge points that exist in each of bins arising from the division to thereby extract a local feature of each of all edge points.

* * * * *